(12) United States Patent
Sekiya et al.

(10) Patent No.: US 8,180,392 B2
(45) Date of Patent: *May 15, 2012

(54) WIRELESS COMMUNICATION DEVICE AND SIGNAL DETECTION CIRCUIT

(75) Inventors: Masahiro Sekiya, Inagi (JP); Minoru Namekata, Kawasaki (JP); Koji Horisaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,253

(22) Filed: Jul. 7, 2011

(65) Prior Publication Data

US 2011/0267958 A1 Nov. 3, 2011

Related U.S. Application Data

(63) Continuation of application No. 12/196,564, filed on Aug. 22, 2008, now Pat. No. 7,986,966.

(30) Foreign Application Priority Data

Aug. 22, 2007 (JP) .................................. 2007-216033

(51) Int. Cl.
*H04M 1/00* (2006.01)
(52) U.S. Cl. ................. 455/552.1; 455/63.1; 455/67.11; 455/67.13; 455/114.2; 455/450; 455/509; 370/329; 370/337; 370/342; 370/479; 342/159; 342/52; 342/57; 342/20
(58) Field of Classification Search ............... 455/552.1, 455/63.1, 67.11, 67.13, 114.2, 509, 419, 455/462; 342/52, 57, 20; 370/329, 337
See application file for complete search history.

(56) References Cited

U.S. PATENT DOCUMENTS

| 6,075,779 | A | 6/2000 | Agarwal et al. |
| 6,223,028 | B1 * | 4/2001 | Chang et al. .................. 455/419 |
| 6,380,882 | B1 * | 4/2002 | Hegnauer ........................ 342/28 |

(Continued)

FOREIGN PATENT DOCUMENTS

JP 2002-217767 8/2002

(Continued)

OTHER PUBLICATIONS

Adrian Stephens, et al. "Joint Proposal: High throughput extension to the 802.11 Standard: Mac"; Document Submission: IEEE 802.11-05/1095r5; Jan. 2006; 104 pages.

(Continued)

*Primary Examiner* — Marceau Milord
(74) *Attorney, Agent, or Firm* — Oblon, Spivak, McClelland, Maier & Neustadt, L.L.P.

(57) ABSTRACT

A wireless communication device that includes a wireless communication unit that performs a wireless communication in a first mode using a first frequency band serving as a first communication channel, and performs the wireless communication in a second mode using a second frequency band including the first communication channel and a second communication channel that is adjacent to the first communication channel. Also included is a detection unit that monitors each of the first frequency band and the second frequency band, outputs a first detection signal when an interference signal is detected in the first frequency band and outputs a second detection signal when the interference signal is detected in the second frequency band. Further included is a determination unit that determines whether the interference signal is in the first communication channel or in the second communication channel based on the first and second detection signals.

2 Claims, 23 Drawing Sheets

U.S. PATENT DOCUMENTS

| | | | |
|---|---|---|---|
| 6,697,013 | B2 | 2/2004 | McFarland et al. |
| 6,870,815 | B2 | 3/2005 | McFarland et al. |
| 6,954,171 | B2 | 10/2005 | Husted et al. |
| 7,024,188 | B2 | 4/2006 | Khun-Jush et al. |
| 7,236,782 | B2 | 6/2007 | Utsunomiya et al. |
| 7,269,151 | B2 | 9/2007 | Diener et al. |
| 7,289,056 | B2 | 10/2007 | Liu et al. |
| 7,424,268 | B2 | 9/2008 | Diener et al. |
| 7,457,620 | B2 | 11/2008 | Lam et al. |
| 7,545,308 | B2 | 6/2009 | Mitsugi |
| 7,564,816 | B2 * | 7/2009 | McHenry et al. ............ 370/329 |
| 7,570,193 | B2 | 8/2009 | Bagge |
| 7,593,692 | B2 | 9/2009 | Hansen et al. |
| 7,701,382 | B2 | 4/2010 | Hansen |
| 7,702,291 | B2 | 4/2010 | Hansen |
| 7,986,966 | B2 * | 7/2011 | Sekiya et al. ............ 455/552.1 |
| 2006/0082489 | A1 | 4/2006 | Liu et al. |
| 2006/0286935 | A1 | 12/2006 | Utsunomiya et al. |
| 2007/0069943 | A1 * | 3/2007 | Adams et al. ................ 342/130 |

FOREIGN PATENT DOCUMENTS

| | | |
|---|---|---|
| JP | 2005-210616 | 8/2005 |
| JP | 2006-81149 | 3/2006 |
| JP | 2006-217347 | 8/2006 |

OTHER PUBLICATIONS

Office Action issued Oct. 4, 2011, in Japanese Patent Application No. 2010-049719 with English translation.

* cited by examiner

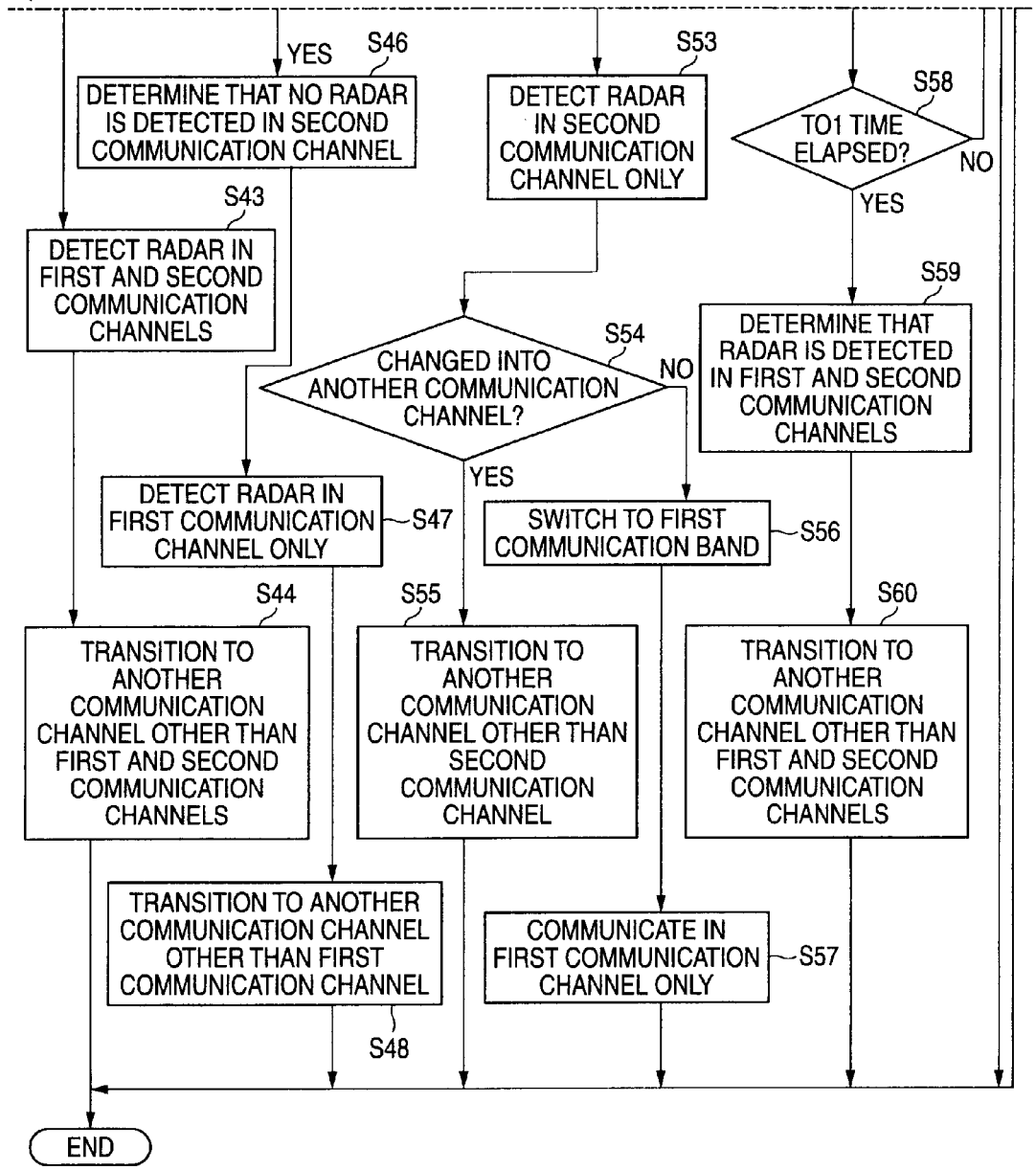

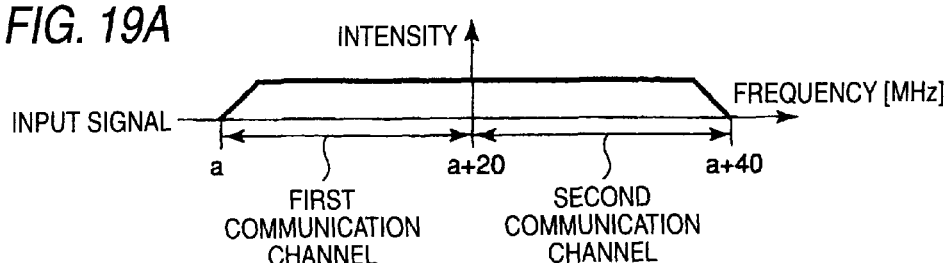
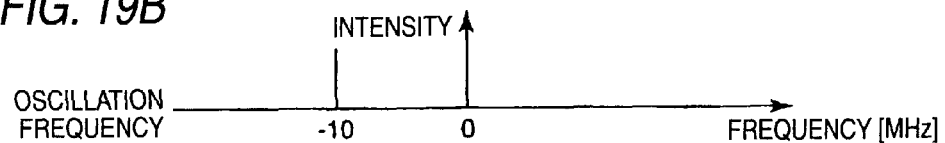
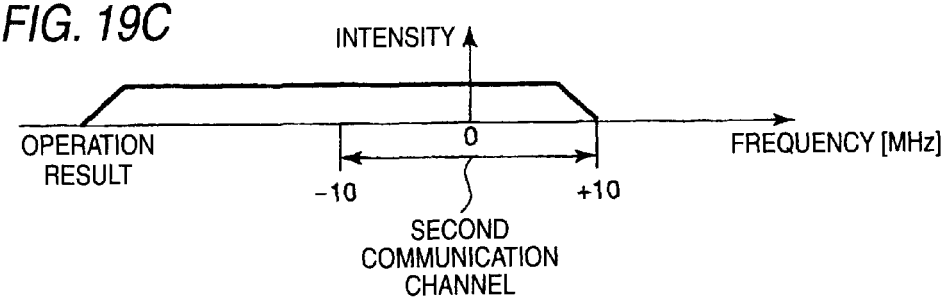
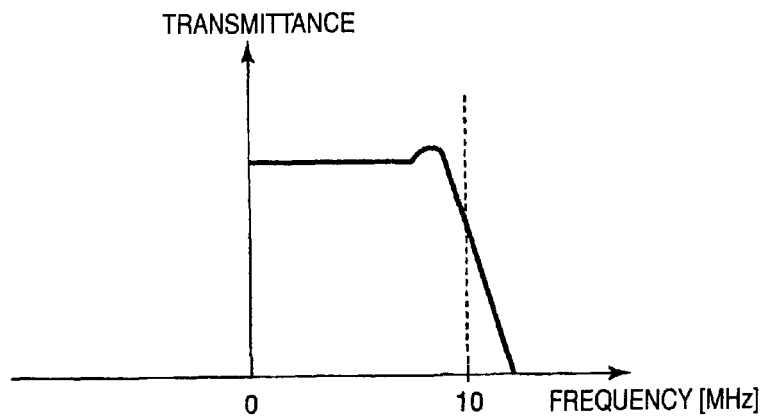

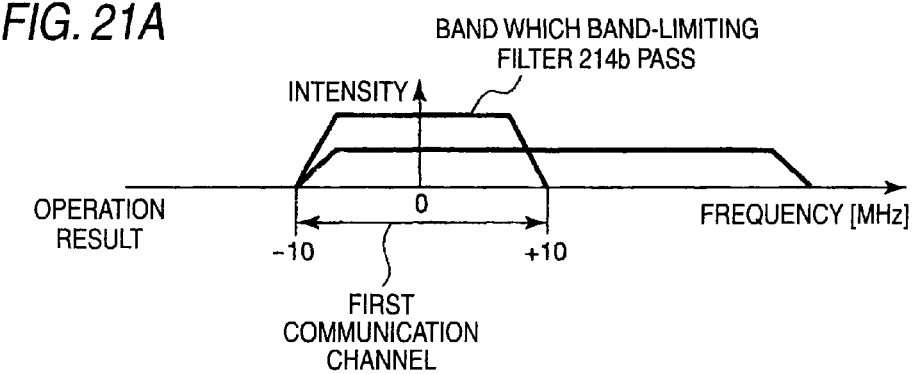
FIG. 21A
FIG. 21B
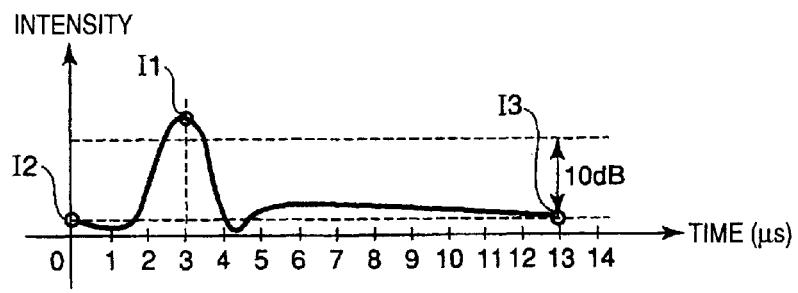
FIG. 22

WIRELESS COMMUNICATION DEVICE AND SIGNAL DETECTION CIRCUIT

CROSS-REFERENCE TO RELATED APPLICATIONS

This application is a continuation Application of, and claims the benefit of priority under 35 U.S.C. §120 from, U.S. application Ser. No. 12/196,564, filed Aug. 22, 2008, now U.S. Pat. No. 7,986,966, which claims the benefit of priority under 35 U.S.C. §119 from Japanese Patent Application No. 2007-216033 filed on Aug. 22, 2007. The entire contents of each of the above applications are incorporated herein by reference.

FIELD

The present invention relates to a wireless communication device and a signal detection circuit for improving efficiency in usage of a communication band in a wireless LAN system.

BACKGROUND

In a wireless LAN system, it is required by a Federal Communications Commission (FCC) to monitor a presence of a radar system (The details of the requirement is described in FCC 06-96). For example, the radar system may be those used in the meteorological bureau. When a radar system is found in a communication band used by the wireless LAN system, the wireless LAN system is required to change the communication band to avoid a conflict with the radar system.

In a conventional wireless LAN system of Institute of Electrical and Electronics Engineers (IEEE) 802.11a, wireless communication is performed using a frequency band having 20 MHz bandwidth. Accordingly, a radar signal may be monitored for a frequency band having 20 MHz bandwidth. An example of such conventional technique is disclosed in JP-A-2005-210616 (counterpart U.S. publication is: US 2005/0162304 A1).

As a measure for increasing a transmission rate in a recent wireless LAN, there is proposed to extend the frequency band in IEEE 802.11n standard. In the IEEE 802.11n standard, wireless communication is also available in 40 MHz bandwidth in addition to the conventional 20 MHz bandwidth. When the conventional radar detecting method is employed to the system conforming to the 802.11n standard, the radar may be monitored in only one of the bandwidths. Therefore, when the radar is detected, the wireless LAN system needs to operate to either terminate the communication or change a communication channel, thereby deteriorating efficiency in usage of a frequency band.

SUMMARY

According to a first aspect of the invention, there is provided a wireless communication device including: a wireless communication unit that is configured to: perform a wireless communication in a first mode using a first frequency band serving as a first communication channel; and perform the wireless communication in a second mode using a second frequency band including the first communication channel and a second communication channel that is adjacent to the first communication channel; a detection unit that is configured to: monitor each of the first frequency band and the second frequency band; output a first detection signal when an interference signal is detected in the first frequency band; and output a second is detection signal when the interference signal is detected in the second frequency band; and a determination unit that determines whether the interference signal is in the first communication channel or in the second communication channel based on the first detection signal and the second detection signal.

According to a second aspect of the invention, there is provided a wireless communication device including: a wireless communication unit that is configured to: perform a wireless communication in a first mode using a first frequency band serving as a first communication channel; and perform the wireless communication in a second mode using a second frequency band including the first communication channel and a second communication channel that is adjacent to the first communication channel; an A/D converter that converts a radio signal received by the wireless communication unit into a digital signal; and a detection unit that monitors the digital signal to detect an interference signal in the first communication channel and the second communication channel, wherein the detection unit includes: a frequency converter that converts a frequency of the digital signal using an oscillation signal having a given oscillation frequency to output a converted signal; a filter that has a cutoff frequency that equals to the oscillation frequency and filters the converted signal to output a first component of the converted signal corresponding to the first communication channel and a second component of the converted signal corresponding to the second communication channel; a measurement unit that measures a first intensity of the first component and a second intensity of the second component; and a determination unit that determines the interference signal based on the first intensity and the second intensity.

According to a third aspect of the invention, there is provided a signal detection circuit including: a frequency converter that converts a frequency of a digital signal using an oscillation signal having a given oscillation frequency to output a converted signal; a filter that has a cutoff frequency that equals to the oscillation frequency and filters the converted signal to output a component of the converted signal; a measurement unit that measures an intensity of the component; and a detection unit that detects a pulse signal in the digital signal based on the intensity measured by the measurement unit.

BRIEF DESCRIPTION OF THE DRAWINGS

In the accompanying drawings:

FIGS. 17A and 17B show waveforms of the signal in the frequency converting unit of the wireless communication device related to the fourth embodiment, wherein FIG. 17A shows waveform of the digital signal, and FIG. 17B shows a frequency spectrum of the oscillation signal;

FIGS. 18A-18C show waveforms of the signal in the frequency converting unit of the wireless communication device related to the fourth embodiment, wherein FIG. 18A shows waveform of the digital signal, FIG. 18B shows a frequency spectrum of the oscillation signal, and FIG. 18C shows a multiplication result in the complex multiplier;

FIGS. 19A-19C show waveforms of the signal in the frequency converting unit of the wireless communication device related to the fourth embodiment, wherein FIG. 19A shows waveform of the digital signal, FIG. 19B shows a frequency spectrum of the oscillation signal, and FIG. 19C shows a multiplication result in the complex multiplier;

FIG. 20 is a graph showing a frequency characteristic the band-limiting filter included in the wireless communication device related to the fourth embodiment;

FIGS. 21A and 21B are graphs showing a multiplication result in the complex multiplier and a frequency characteristic of the band-limiting filter in the wireless communication device related to the fourth embodiment, wherein FIG. 21A shows a case of passing the first communication channel, and FIG. 21B shows a case of passing the second communication channel;

FIG. 22 is a graph showing a time variation of the signal intensity input to the pulse determining unit included in the wireless communication device related to the fourth embodiment;

DETAILED DESCRIPTION OF THE EMBODIMENT(S)

Figure 1:
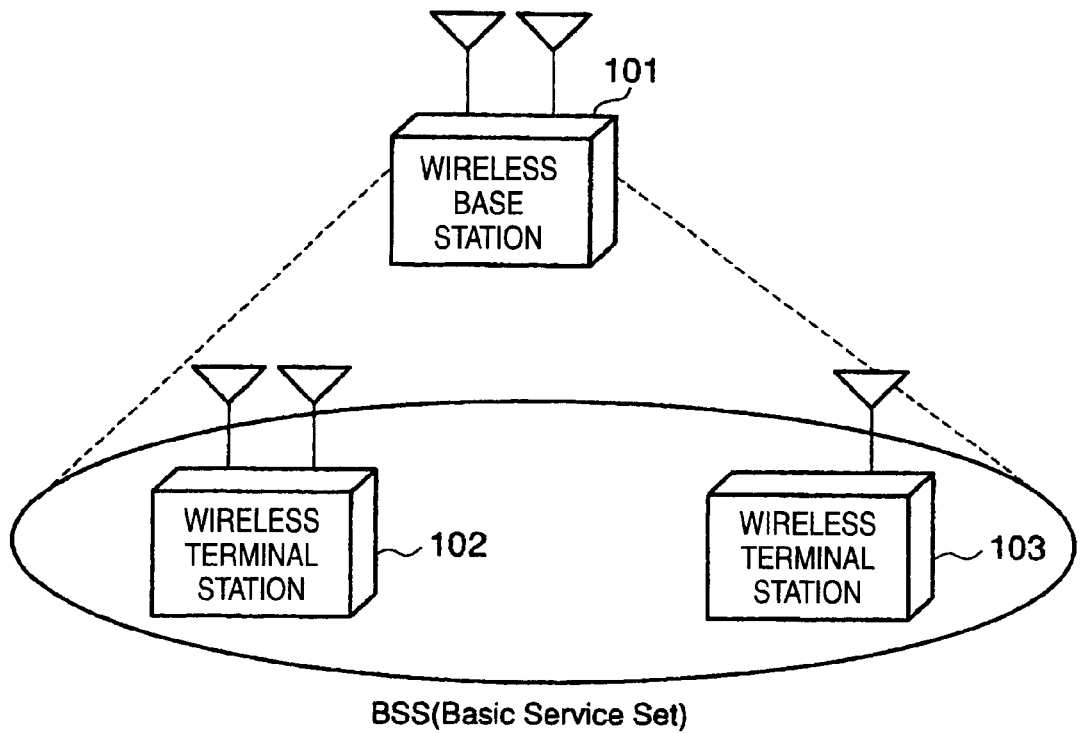
FIG. 1 is a block diagram of a wireless LAN system related to the first embodiment of the present invention.

Embodiments of the present invention will now be described with reference to the accompanying drawings. In the following disclosure, common reference numerals are assigned to common components and elements throughout the drawings.

First Embodiment

A wireless communication device and a signal detection circuit related to a first embodiment of the present invention will be described with reference to FIG. 1. FIG. 1 is a conceptual diagram of a wireless LAN system related to the first embodiment and shows a wireless LAN system according to an IEEE 802.11 standard.

As shown in FIG. 1, the wireless LAN system related to the first embodiment includes a wireless base station 101 and wireless terminal stations 102 and 103, and wireless communication is performed among those stations 101, 102, and 103. A unit configured by the wireless base station 101 and at least one wireless terminal station is referred to as a BBS (Basic Service Set) in the IEEE 802.11 standard. The two wireless terminal stations 102 and 103 included in the BSS are shown in FIG. 1, but the number of wireless terminal stations is not limited to two. The wireless terminal stations 102 and 103 can have a plurality of antennas capable of transmitting and receiving a data stream. In the BBS, the wireless base station 101 with a plurality of antennas and the wireless terminal station 103 with a single antenna can coexist. One or more antennas can be installed in the wireless base station 101 or the wireless terminal stations 102 and 103 according to communication methods implemented in the wireless LAN system.

Figure 2:
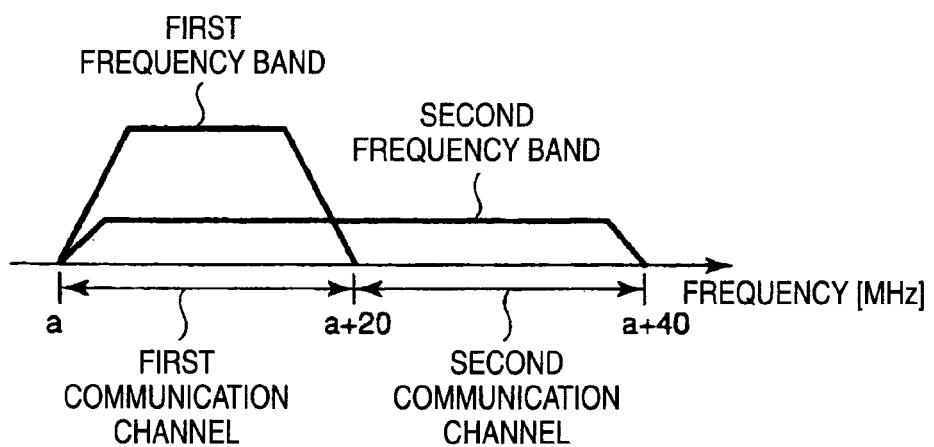
FIG. 2 is a band diagram showing frequency bands used for the wireless LAN system related to the first embodiment.

FIG. 2 is a band diagram showing frequency bands used for a wireless LAN system related to the first embodiment. As shown in FIG. 2, the wireless LAN system uses a first frequency band and a second frequency band that overlaps with each other. The first frequency band has a bandwidth of 20 MHz between A MHz and (A+20) MHz. Hereinafter, a band corresponding to the first frequency band is referred to as a first communication channel. The second frequency band has a bandwidth of 40 MHz between A MHz and (A+40) MHz. Hereinafter, a band between (A+20) MHz and (A+40) MHz is referred to as a second communication channel.

That is, the second frequency band includes the first communication channel and the second communication channel adjacent to the first communication channel. Only wireless communication in the first frequency band is available in the conventional IEEE 802.11a standard or the like, but wireless communication using the second frequency band as well as the first frequency channel is available in an IEEE 802.11n standard.

The bandwidth of 20 MHz between A MHz and (A+20) MHz can be defined as a second communication channel and the band between (A+20) MHz and (A+40) MHz can be defined as a first communication channel. In the first embodiment, an example is described, in which the bandwidth of the first frequency band is 20 MHz and the bandwidth of the second frequency band is 40 MHz. However, for example, the bandwidth of the first frequency band may be set to 40 MHz and the bandwidth of the second frequency band may be set to 80 MHz.

Figure 3:
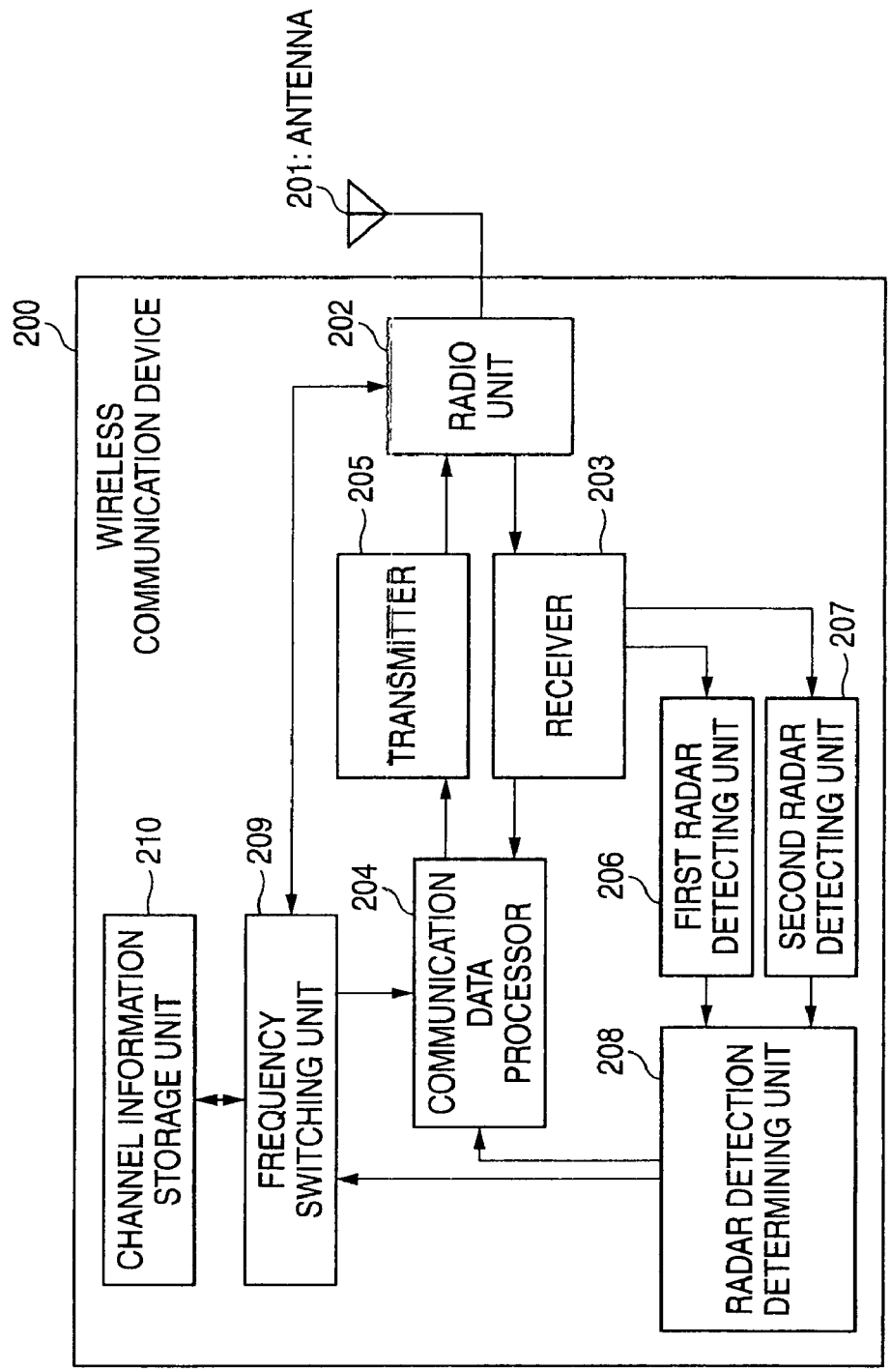
FIG. 3 is a block diagram showing an example of the wireless communication related to the first embodiment.

The wireless base station 101 related to the first embodiment is provided with a wireless communication device for establishing the above described wireless communication. FIG. 3 is a block diagram of the wireless communication device provided in the wireless base station 101.

As shown in FIG. 3, the wireless communication device 200 includes an antenna 201, a radio unit 202, a receiver 203, a communication data processor 204, a transmitter 205, a first radar detecting unit 206, a second radar detecting unit 207, a radar detection determining unit 208, a frequency switching unit 209, and a channel information storage unit 210.

The antenna 201 receives a radio signal (RF signal, analog signal) transmitted from the wireless terminal stations 102 and 103 in the BBS and transmits a radio signal destined for the wireless terminal stations 102 and 103.

When wireless communication is performed in the second frequency band having 40 MHz bandwidth, the radio unit 202 operates to receive and transmit a radio signal of the 40 MHz bandwidth according to a command from the frequency switching unit 209. When wireless communication is performed in the first frequency band having 20 MHz bandwidth, the radio unit 202 operates to receive and transmit a radio signal of the 20 MHz bandwidth according to a command from the frequency switching unit 209. When the radio signal is received, the radio unit 202 down-converts a radio signal of 5 GHz received from the antenna 201 into a baseband signal to be supplied to the receiver 203. Upon transmission, the radio unit 202 up-converts a baseband signal provided by the transmitter 203 into a radio signal of 5 GHz and the radio signal is transmitted from the antenna 201.

When a radio signal is received, the receiver 203 converts a baseband signal provided by the radio unit 202 from an analog signal into a digital signal. The baseband signal converted into the digital signal is demodulated and supplies to the communication data processor 204. The receiver 203 supplies the baseband signal converted into the digital signal to the first radar detecting unit 206 and the second radar detecting unit 207.

Figure 4:
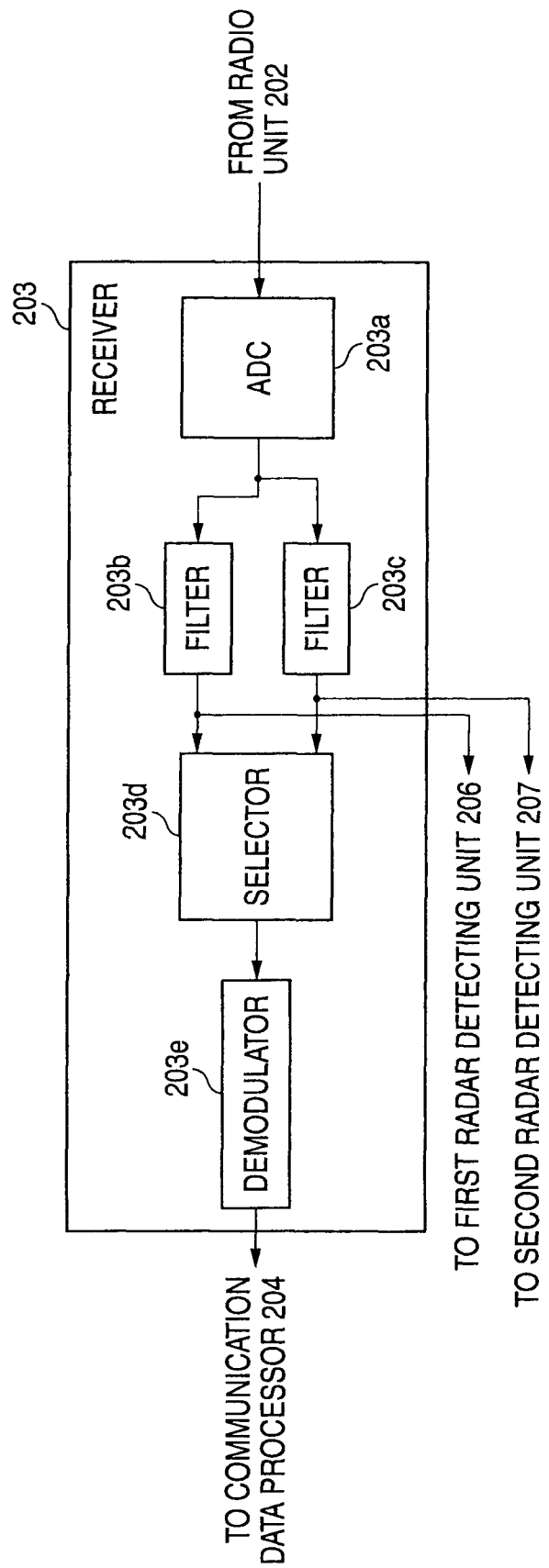
FIG. 4 is a block diagram of a receiver included in the wireless communication device related to the first embodiment.

The receiver 203 will be described in detail with reference to FIG. 4. FIG. 4 is a block diagram of the receiver 203. As shown, the receiver 203 includes an A/D converter (hereinafter, referred to as "ADC") 203a, filters 203b and 203c, a selector 203d, and a demodulator 203e.

The ADC 203a converts the baseband signal provided by the radio unit 202 from an analog signal to a digital signal. The ADC 203a supplies the radio signal converted into the digital signal (hereinafter, simply referred to as "digital signal") to the filters 203b and 203c.

The filter 203b is configured to only pass through a signal of a 20 MHz bandwidth from among the digital signals sent from the ADC 203a and the filter 203c is configured to only pass through a signal of a 40 MHz bandwidth. The digital signals filtered in the filters 203b and 203c are respectively output to the first and second radar detecting units 206 and 207. The two signals are also output to the selector 203d.

The selector 203d supplies an output from the filter 203b to the demodulator 203e upon wireless communication using the first frequency band, and supplies an output from the filter 203c to the demodulator 203e upon wireless communication using the second frequency band. It is determined which one of the outputs from the filters 203b and 203c is to be selected, for example, according to a command from the demodulator 203e.

The demodulator 203e performs a demodulation process for the digital signal supplied from the selector 203d defined in a wireless LAN system of the IEEE 802.11 standard. For example, a baseband reception signal is obtained by performing Orthogonal Frequency Division Multiplexing (OFDM) demodulation and error correction decoding. The demodulator 203e sends the obtained baseband reception signal to the communication data processor 204.

Description is made by referring back to FIG. 3. The communication data processor 204 performs baseband processing for transmission/reception data. For example, upon receipt of the radio signal, the processor 204 removes a Media Access Control (MAC) header from the baseband reception signal provided by the receiver 203 to assemble a packet. The packet is transmission/reception data assembled in a data structure capable of being processed by a personal computer. On the contrary, upon transmission, a frame is assembled by adding the MAC header to data to be transmitted. The frame is transmission/reception data assembled for wireless communication. The frame is output to the transmitter 205.

The transmitter 205 performs a modulation process for the frame sent from the communication data processor defined in a wireless LAN system of the IEEE 802.11 standard. For example, a baseband signal is obtained by performing OFDM modulation and error correction encoding. The baseband signal is converted from a digital signal to an analog signal. The obtained analog signal is supplied to the radio unit 202.

The first radar detecting unit 206 detects a radar in the 20 MHz bandwidth from the digital signal given by the filter 203b of the receiver 203. A detection result is output to the radar detection determining unit 208. It is detected whether or not there is the radar in the first communication channel. When the radar has been detected, the first radar detecting unit 206 sends a first detection signal to the radar detection determining unit 208.

The second radar detecting unit 207 detects the radar in the 40 MHz bandwidth from the digital signal given by the filter 203c of the receiver 203. A detection result is output to the radar detection determining unit 208. When the radar is detected, the second radar detecting unit 207 outputs a second detection signal to the radar detection determining unit 208. Therefore, the first radar detecting unit 206 can detect whether or not there is the radar in the first frequency band having 20 MHz bandwidth and the second radar detecting unit 207 can detect whether or not there is the radar in the second frequency band having 40 MHz bandwidth.

The radar detection determining unit 208 determines where the radar is present in the first frequency band or in the second frequency band, based on the output signals from the first radar detecting unit 206 and the second radar detecting unit 207. As a result, when the radar is detected from the frequency currently in use, the radar detection determining unit 208 determines that change of the frequency band to perform communication or change of communication channel is required. The radar detection determining unit 208 sends a frequency changing indication signal to the frequency switching unit 209. The radar detection determining unit 208 commands the communication data processor 204 to suspend the data transmission.

The frequency switching unit 209 changes a frequency band or a communication channel in response to the frequency changing indication signal sent from the radar detection determining unit 208. When the change is performed, the frequency switching unit 209 notifies the change to the radio unit 202. The change of a frequency band or a communication channel by the frequency switching unit 209 is performed according to information in the channel information storage unit 210. In other words, the frequency switching unit 209 instructs the radio unit 202 to be switched to a new communication channel by setting channel information obtained from the channel information storage unit 210 in the radio unit 202. For example, when the radar is detected from the corresponding band during communication in the communication channel of 40 MHz bandwidth and a change to communication in the communication channel of 20 MHz bandwidth is made, the frequency switching unit 209 notifies its information to the radio unit 202. Then, setting of the radio unit 202 is changed such that the radio unit 202 can communicate in the communication channel of 20 MHz bandwidth. Accordingly, the radio unit 202 is switched from an operation of receiving a signal of 20 MHz bandwidth to an operation of receiving a signal of 40 MHz bandwidth.

When the radio unit 202 switches the operation, the radio unit 202 notifies completion of the switching to the frequency switching unit 209. Upon receipt of the notify, the frequency switching unit 209 notifies a change of the communication channel or a change of the frequency bandwidth to the communication data processor 204. Accordingly, after recognition of the frequency band occupied in the BSS at present, the communication data processor 204 can transmit data.

The channel information storage unit 210 stores a plurality of communication channel information within frequency bands available as a wireless LAN system. In a wireless LAN system compatible with the IEEE 802.11 standard, the available frequency bands are plural and a plurality of communication channels are available in each bands. The wireless LAN system according to this embodiment can select available channels of the plurality of communication channels to communicate.

Figure 5:
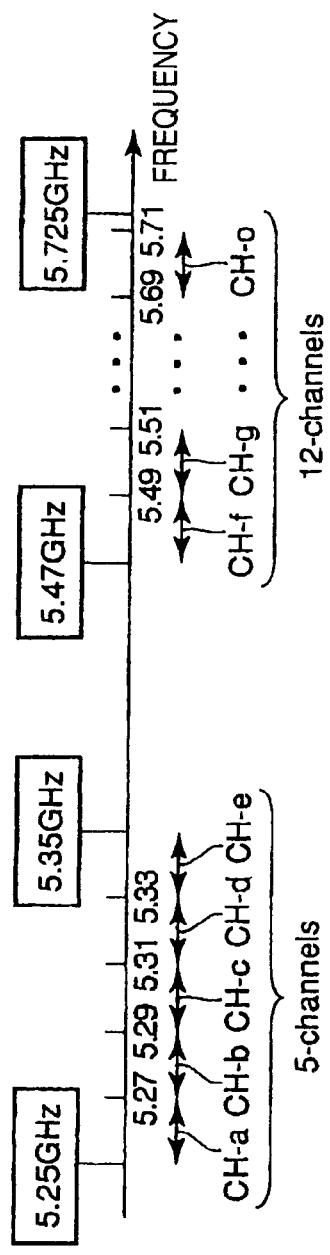
FIG. 5 is a graph showing frequency bands available in the wireless LAN system related to the first embodiment.

FIG. 5 is a conceptual view showing available frequency bands in the wireless LAN system related to the first embodiment, and, especially, showing frequency bands requiring for radar detection. Typically, frequency bands available in a wireless LAN system are a band between 5.15 GHz and 5.25 GHz, a band between 5.25 GHz and 5.35 GHz, and a band between 5.47 GHz and 5.725 GHz. Among the frequency bands, a communication channel in the band between 5.25 GHz and 5.35 GHz and the band between 5.47 GHz and 5.725 GHz have a large transmittance power to be used even in the outdoor. Consequently, since these bands have a possibility of interference with radar, radar detection is required in case of use of these bands. Further, in these bands, limiting a case of selection of communication channels in which no radar is present, such communication channel can be used.

Figure 6:
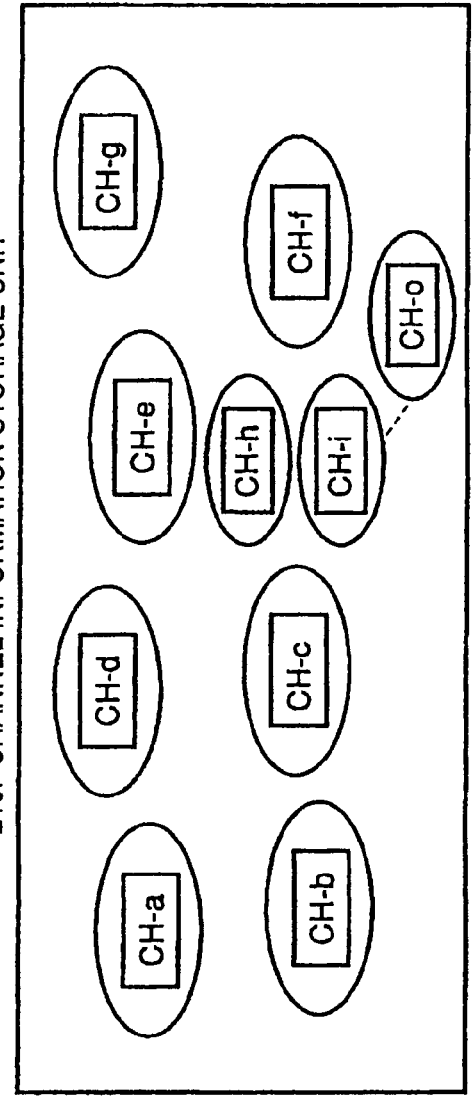
FIG. 6 is a conceptual view of information stored in the channel information storage unit included in the wireless communication device related to the first embodiment.

FIG. 6 is a conceptual view of channel information stored in the channel information storage unit 210. The channel information storage unit 210 stores information CH-a to CH-o relating to communication channels available in the wireless LAN system related to this embodiment. These communication channels are communication channels selectable from frequency bands available by the radio law.

In the first embodiment, frequencies of 5.25 GHz to 5.35 GHz and 5.47 GHz to 5.725 GHz shown in FIG. 5 are available, and the channel information storage unit 210 obtains channel information from the frequency ranges. As an example, a bandwidth of each communication channel is 20 MHz as described with reference to FIG. 2. Therefore, available communication channels from a band between 5.25 GHz and 5.35 GHz are five. That is, each of a band of 5.25 ~5.27 GHz, a band of 5.27~5.29 GHz, . . . , and a band of 5.33~5.35 GHz becomes a communication channel. Available communication channels from a band between 5.47 GHz and 5.725 GHz are twelve. That is, each of a band of 5.47 ~5.49 GHz, a band of 5.49~5.51GHz, . . . , and a band of 5.69 ~5.71 GHz becomes a communication channel. Thus, upon communication using the first frequency band, communication in the 20 MHz bandwidth is performed using any one of the above communication channels as the first communication channel (see FIG. 2). On the other hand, upon communication using the second frequency band, communication in the 40 MHz bandwidth is performed using two adjacent communication channels described above. In this case, of two communication channels, the communication channel at a low frequency side becomes the first communication channel and the communication channel at a high frequency side becomes the second communication channel. The channel information storage unit 210 stores information relating to each of the communication channels of the 20 MHz bandwidth as information of CH-a to CH-o.

Methods of selecting the communication channels are not limited to the above method, but the communication channel at a low frequency side may become the second communication channel and the communication channel at a high frequency side may become the first communication channel.

The frequency switching unit 209 controls the radio unit 202 and the communication data processor 204 using the information CH-a to CH -o. The frequency switching unit 209 may select communication channels at random or first select them from communication channels at a high frequency side, when a communication channel is changed. Upon numbering the respective communication channels as the first, second, and third channels, an even number channel or an odd number channel among them may be selected. Communication channels may be properly selected using a selection technique such as a specific algorithm or the like.

Figure 7:
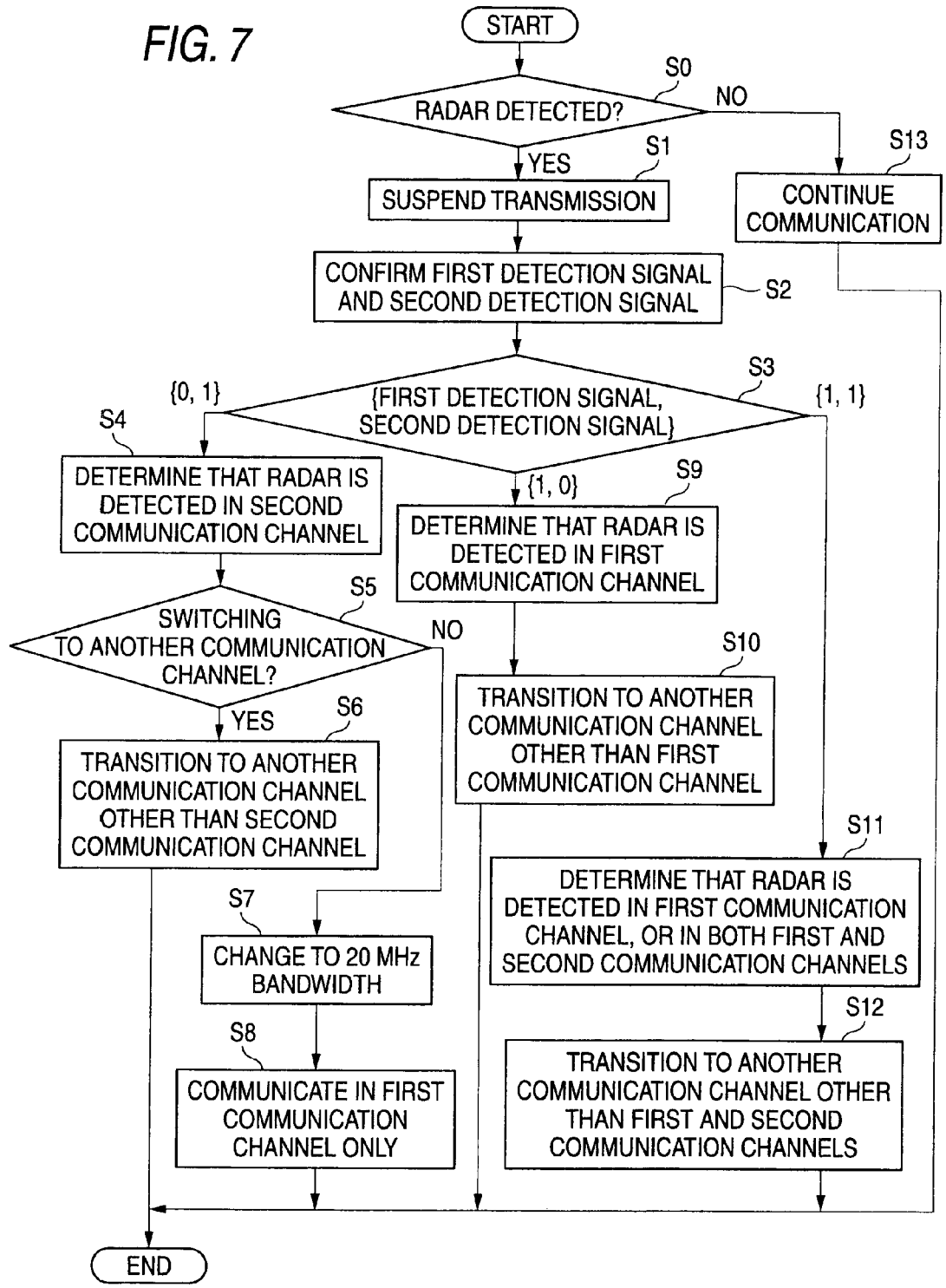
FIG. 7 is a flowchart showing an operation of the wireless communication device related to the first embodiment.

An operation from radar detection to frequency conversion in the wireless communication device 200 with such configuration will now be described in detail with reference to FIG. 7. FIG. 7 is a flowchart showing a flow of the operation of the wireless communication device 200.

It is assumed that the wireless communication device 200 communicates using any communication channels and thus the second frequency band having 40 MHz bandwidth. The radar detection determining unit 208 in the wireless communication device 200 of the wireless base station 101 checks the detection signals from the first radar detecting unit 206 and the second radar detecting unit 207. If detecting radar in the first radar detecting unit 206 and/or the second radar detecting unit 207 (step S0), the radar detection determining unit 208 instructs the communication data processor 204 to suspend the data transmission. The communication data processor 204 suspends the data transmission in response thereto (step S1). Subsequently, the radar detection determining unit 208 confirms the first detection signal and the second detection signal from the first radar detecting unit 206 and the second detecting unit 207, respectively (step S2).

Hereinafter, for the first detection signal and the second detection signal, a case in which the signal is output is denoted by "1" and a case in which the signal is not output is denoted by "0". Combinations of detection results of the first and second detection signals are denoted by (0, 1), (1, 0), and (1, 1).

At first, a case in which a detection result by the radar detection determining unit 208 is (first detection signal, second detection signal)=(0, 1) (S3, {0, 1}), will be described. This corresponds to a case in which the radar is not detected from the first frequency band but is detected from the second frequency band. Then, the radar detection determining unit 208 determines that the radar is present in the second communication channel (step S4). In this case, communication cannot be kept using the second communication channel. That is, it is impossible to communicate using the second frequency band including the second communication channel. Since, however, no radar is present in the first communication channel, communication is possible using only the first communication channel (i.e., using 20 MHz bandwidth).

For example, as shown in FIG. 6, it is assumed that, the channel (CH-a) with the band of 5.25~5.27 GHz is the first communication channel and the channel (CH-b) with the band of 5.27~5.29 GHz is the second communication channel, and communication in the 40 MHz band has been performed in such a state. The meaning of (first detection signal, second detection signal)=(0, 1) is detection of radar in the second communication channel with the band of 5.27~5.29 GHz. Therefore, in this case, the communication may be changed into a communication using only the first communication channel with the band of 5.25 ~5.27 GHz (20 MHz bandwidth communication), or the second communication channel may be changed into another band to continue performing the 40 MHz bandwidth communication. When continuing the 40 MHz bandwidth communication, the band used as the second communication channel should be changed to the band other than the original band of 5.25 ~5.29 GHz, for example, to a band of 5.29~5.33 GHz. In this case, a communication channel with the band of 5.29 ~5.31 GHz is used as the first communication channel and a communication channel with the band of 5.31~5.33 GHz is used as the second communication channel.

Accordingly, the radar detection determining unit 208 determines whether the communication channel currently in use is to be changed into another communication channel (step S5). That is, the radar detection determining unit 208 determines in step S5 whether a dual channel communication by the first communication channel and the second communication channel could be continued.

The determination in step S5 performed by the radar detection determining unit 208 may be designed as appropriate to optimize the performance of the communication established by the wireless communication device 200. An example of the determination in step S5 is as described below.

The wireless communication device 200 is configured to scan through all the communication channels CH-a to CH-o previous to starting the wireless communication and periodically during the wireless communication, to thereby select available communication channels that are available for establishing the wireless communication from among the communication channels CH-a to CH-o. The available communication channels are those less busy and unoccupied by other communication devices and having low noise levels.

The determination in step S5 is performed in consideration of the available communication channels as follows. For example, the radar detection determining unit 208 determines to continue the dual channel communication in a case where a new pair of communication channels, which are adjacent to each other, are selectable from among the available communication channels. And, the radar detection determining unit 208 determines that the dual channel communication cannot be continued and determines to switch to a wireless communication by the frequency band of 20 MHz.

When determined by the radar detection determining unit 208 to switch the communication channel to another band (S5, YES), the radar detection determining unit 208 notifies the determination result to the radio unit 202 and the communication data processor 204. For example, when a band of 5.29~5.33 GHz is in use, the information CH-c and CH-d is read out from the channel information storage unit 210 and the radio unit 202 is set based on the information. Accordingly, the wireless communication device resumes communication in the 40 MHz bandwidth using the communication channel of a band different from the previously used band (S6).

When determined that the communication channel is not to be switched by the radar detection determining unit 208 (S5, NO), the radar detection determining unit 208 changes the frequency band to be used from the second frequency band to the first frequency band and determines to resume wireless communication by only using the first communication channel (S7). The frequency switching unit 209 outputs frequency band change information to the communication data processor 204 and the radio unit 202. As a result, the wireless base station 101 resumes communication in the first frequency channel only (step S8).

A case in which a detection result by the radar detection determining unit 208 is (first detection signal, second detection signal)=(1, 0) (S3, {1, 0}), will be described. This case corresponds to a case in which radar is detected from the first frequency band but is not detected from the second frequency band. Although this case does not occur as long as the wireless communication device 200 operates normally, such a case is present as a detection result apparently, and, such a detection result may be obtained due to certain causes. Therefore, this embodiment prepares a countermeasure against a case of (first detection signal, second detection signal)=(1, 0).

In this case, radar detection determining unit 208 determines that radar is present only in the first communication channel (step S9). Thus, communication using the first communication channel cannot continue. That is, communication using the second frequency band including the corresponding first communication channel is impossible. Of course, unlike step S7, communication changed into a frequency band having 20 MHz bandwidth is also not available. Therefore, the radar detection determining unit 208 resumes 40 MHz bandwidth communication using a communication channel different from the corresponding first communication channel (step S10). This processing is the same as that in step S6.

A case in which a detection result by the radar detection determining unit 208 is (first detection signal, second detection signal)=(1, 1) (step S3, {1, 1}), will be described. This case corresponds to a case in which radar is detected from both the first frequency band and the second frequency band. In this case, the radar detection determining unit 208 determines that the radar is detected from the first communication channel only or from both the first communication channel and the second communication channel (step S11).

According to a detection result, it is not possible to specify where the radar is present in the first communication channel or the second communication channel. Thus, the radar detection determining unit 208 suspends the use of both the first communication channel and the second communication channel.

Accordingly, the radar detection determining unit 208 changes the first and second communication channels into a different frequency communication channel (step S12). In other words, as described above, it is assumed that the channel (CH-a) with the band of 5.25~5.27 GHz is the first communication channel, the channel (CH-b) with the band of 5.27~5.29 GHz is the second communication channel, and communication in the 40 MHz bandwidth is performed. In the case of (first detection signal, second detection signal)=(1, 1), the use of two communication channels included in the band of 5.25~5.29 GHz is prohibited. Thus, the radar detection determining unit 208 performs 40 MHz bandwidth communication using another communication channel, for example, 5.29~5.33 GHz band.

When it is determined that the radar is not detected from both the first and second radar detecting units 206 and 207 in step S0 (i.e., this corresponds to (first detection signal, second detection signal)=(0, 0)), the wireless communication continues without changing the frequency channel or the frequency band (step S13).

The operation process shown in FIG. 7 may be periodically performed during the communication.

As described above, according to the wireless communication device related to this embodiment, the following advantages may be obtained:

(1) A Communication Frequency Can Be Used Efficiently.

For example, in the conventional IEEE 802.11a standard, a bandwidth of a frequency band used for wireless communication is set to 20 MHz. Thus, the radar observation is sufficiently performed for the frequency band of 20 MHz bandwidth.

However, in the IEEE 802.11n standard, communication is performed in the 40 MHz bandwidth as well as the 20 MHz bandwidth. For example, when the radar is monitored in the 40 MHz band only, and, although the radar is present in the first communication channel only, the communication channel must be changed. Consequently, there is a problem in that the communication frequency use efficiency is lowered and the operation speed is lowered due to the communication channel change.

The wireless communication device 200 related to this embodiment includes the first radar detecting unit 206 for monitoring the radar in the 20 MHz bandwidth and the second radar detecting unit 207 for monitoring the radar in the 40 MHz bandwidth. Thus, the radar detection determining unit 208 can detect that the radar is present in the second communication channel only. In other words, when no radar is detected from the first radar detecting unit 206 but the radar is detected from the second radar detecting unit 207, it can be detected that the radar is present in the second communication channel only. In this case, since the 20 MHz bandwidth communication using the first communication channel is possible, the frequency use efficiency is improved. Since the communication channel change is unnecessary when the 20 MHz bandwidth communication is performed using only the first communication channel, the degradation of the operation speed of the wireless communication device 200 can be prevented.

Second Embodiment

Figure 8:
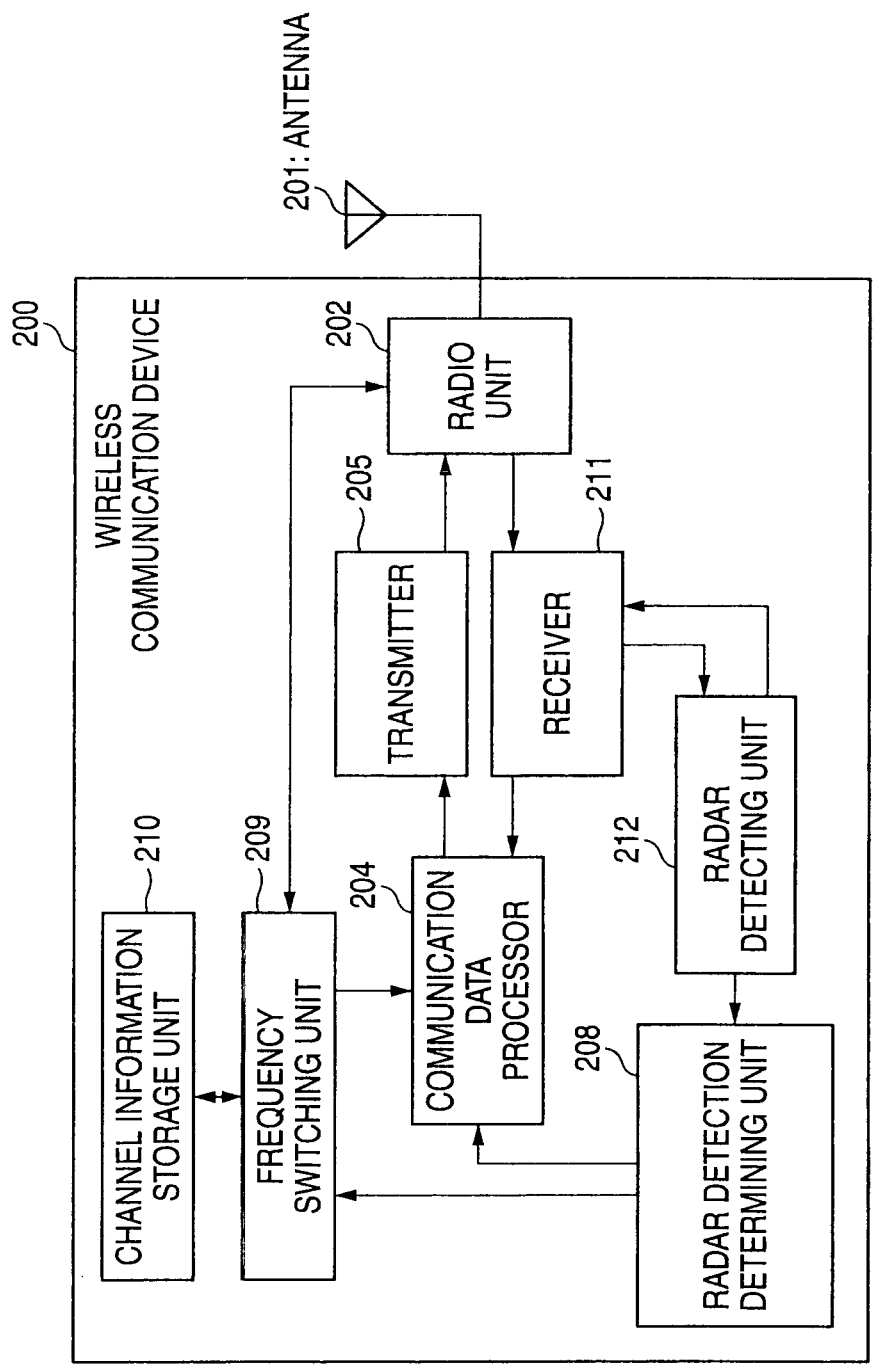
FIG. 8 is a block diagram of the wireless communication device related to a second embodiment of the present invention.

A wireless communication device and a signal detection circuit related to a second embodiment of the present invention will now be described. In the second embodiment, two radar detecting units in the first embodiment are replaced with a single radar detecting unit. FIG. 8 is a block diagram of the wireless communication device related to the second embodiment.

As shown in FIG. 8, the wireless communication device 200 related to the second embodiment of the present invention provides a single radar detecting unit 212 instead of the first and second radar detecting units 206 and 207 of the configuration, which is shown in FIG. 3 and described in the first embodiment, and replaces the receiver 203 with a receiver 211. Since the other elements are the same as those of the first embodiment, the description thereof will be omitted.

Figure 9:
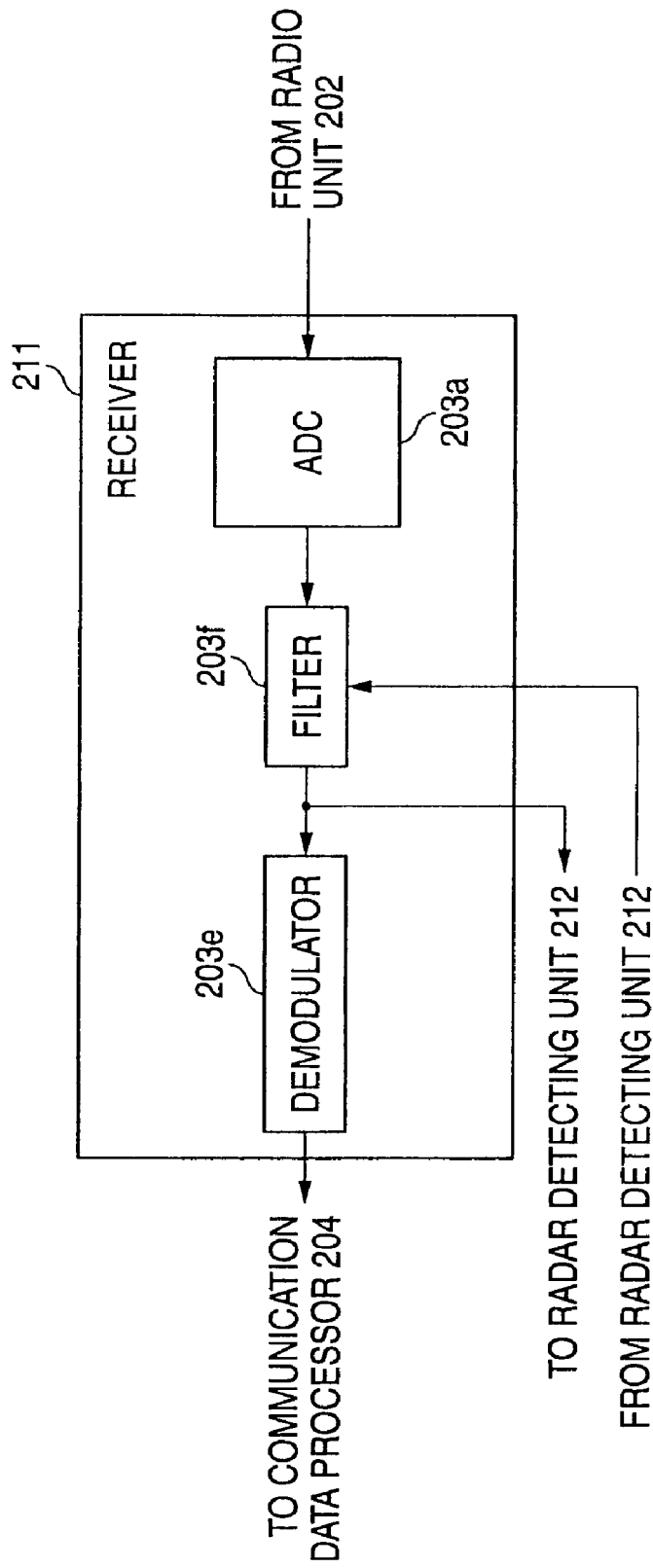
FIG. 9 is a block diagram of the receiver included in the wireless communication device related to the second embodiment.

FIG. 9 is a block diagram of the receiver 211. As shown, the receiver 211 newly includes a filter 203f instead of the filters 203b and 203c, and the selector 203d in the configuration of FIG. 4 described in the first embodiment.

The filter 203f is configured to pass through a signal having the 20 MHz bandwidth or the 40 MHz bandwidth among digital signals sent from the ADC 203a in response to a command from the radar detecting unit 212. In other words, the filter 203f is a filter in which a band to be passed is variable. The digital signals passing through the filter 203f are sent to the demodulator 203e and the radar detecting unit 212. When the wireless communication device 200 performs wireless communication using the first frequency band (20 MHz bandwidth), the filter 203f passes only a signal with the 20 MHz bandwidth. On the other hand, when the wireless communication device 200 performs wireless communication using the second frequency band (40 MHz bandwidth), the filter 203f passes a signal with the 20 MHz bandwidth or a signal with the 40 MHz bandwidth.

The filter 203f includes a filter to pass the second frequency band of 40 MHz bandwidth, a filter to pass the first frequency band of 20 MHz bandwidth corresponding to the first communication channel and a filter to pass 20 MHz bandwidth corresponding to the second communication channel. A certain filter is valid by a command from the radar detecting unit 212. Hereinafter, a state in which the filter 203f operates to pass a frequency band of a bandwidth of 40 MHz is referred to as "second frequency band mode," and a state in which the filter 203f operates to pass a frequency band of a bandwidth of 20 MHz is referred to as "first frequency band mode." In the first frequency band mode, a state in which the filter 203f operates to pass a band corresponding to the first communication channel is referred to as "first channel mode," and a state in which the filter 203f operates to pass a band corresponding to the second communication channel is referred to as "second channel mode."

The radar detecting unit 212 detects the radar from the digital signals sent from the receiver 211, and sends a detection result to the radar detection determining unit 208. The radar detecting unit 212 generates the first detection signal when the filter 203f is in the first frequency band mode and the radar is detected. On the other hand, the radar detecting unit 212 generates the second detection signal when the filter 203f is in the second frequency band mode and the radar is detected. When the radar detecting unit 212 performs communication in the second frequency band and detects the radar from the 40 MHz band, it instructs the filter 203f to pass the 20 MHz only.

Figure 10:
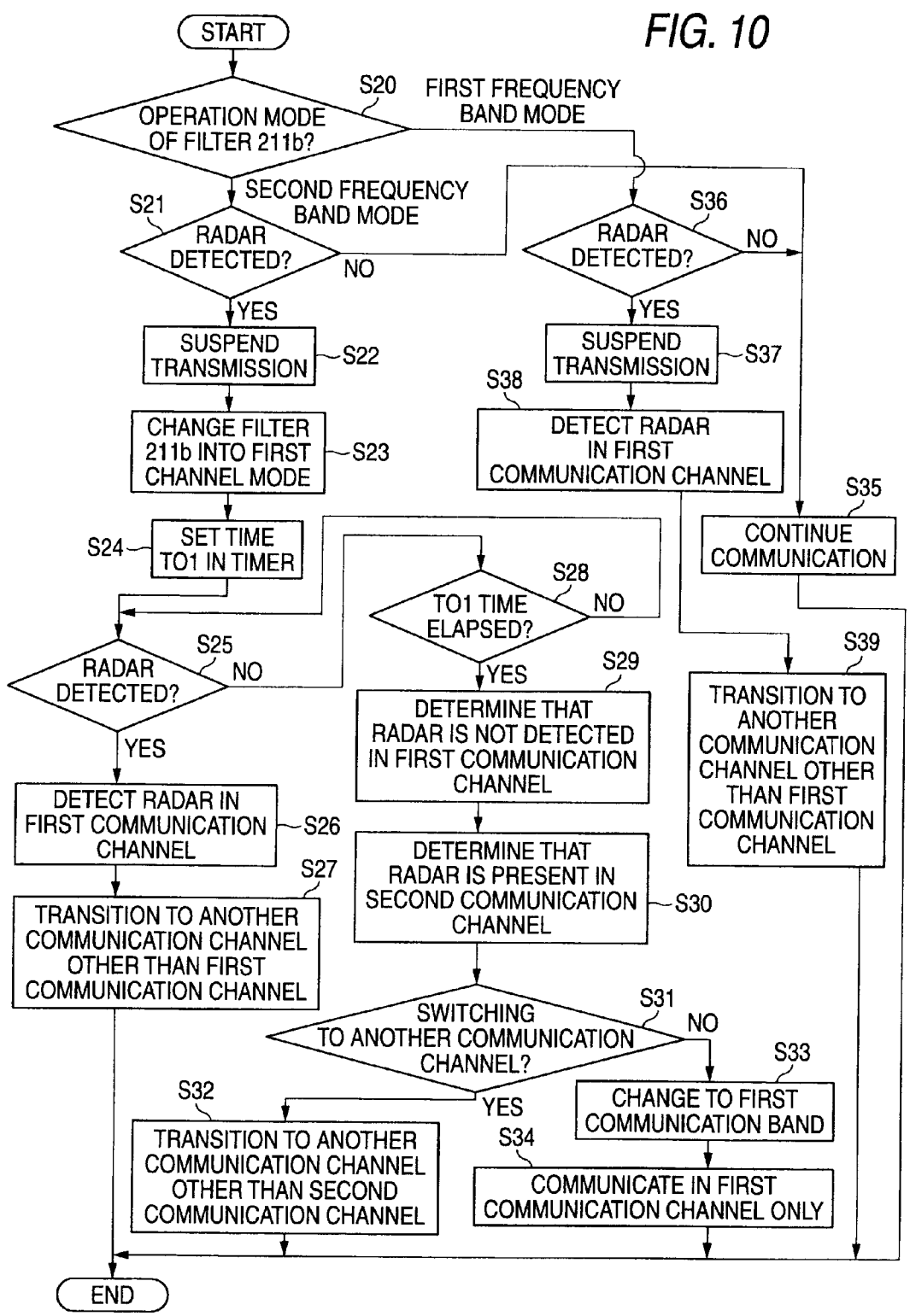
FIG. 10 is a flowchart showing an operation of the wireless communication device related to the second embodiment.

An operation from radar detection to frequency conversion in the wireless communication device 200 with the above configuration will be described in detail with reference to FIG. 10. FIG. 10 is a flowchart showing a flow of an operation of the wireless communication device 200.

First, in the wireless communication device 200, it is assumed that the filter 203f operates in the second frequency band mode before determination of a frequency band to be used, i.e., before determination of a communication channel for performing wireless communication, or during wireless communication (S20).

Therefore, the radar detecting unit 212 detects the radar from the second frequency band. The radar detection determining unit 208 checks the detection signals from the radar detecting unit 212. When the radar is detected in the radar detecting unit 212 (step S21, YES), the radar detection determining unit 208 instructs the communication data processor 204 to suspend the data transmission. The communication data processor 204 suspends the data transmission in response to the instruction (S22).

Subsequently, if the radar detection determining unit 208 determines that radar is detected in the second frequency band, the radar detecting unit 212 instructs the filter 203f to be switched to the first channel mode from the second frequency band mode. The filter 203f is switched to the first channel mode in response to the instruction (step S23).

The radar detecting unit 212 sets a radar observation time TO1 in a timer maintained therein to detect the radar during the set time (S24). The reason why the timer is provided is as follows. That is, the radar is a pulse signal continuously supplied in a constant period. Thus, when a radar observation time is too short, a pulse signal other than the radar may be erroneously detected as the radar. For example, false detection due to thermal noise may be considered. Thus, the radar detecting unit 212 pre-sets the radar observation time TO1. When a pulse signal supplied continuously in a constant period during the set time is detected, the detected signal is determined to be the radar. The radar observation time TO1 is, for example, about 30~70 msec.

When the radar is detected in the first channel mode (S25, YES), the radar detection determining unit 208 determines that the radar is in the first communication channel only, or in both the first communication channel and the second communication channel (S26). Thus, the radar detection determining unit 208 changes the first and second communication channels into a communication channel having different band (S27). The process of steps S26 and S27 corresponds to that of steps S11 and S12 described in the first embodiment.

The radar detection continues until the radar observation time TO1 elapses (S25, NO, S28, NO). When no radar is detected after the TO1 has elapsed (S28, YES), the radar detecting unit 212 determines that no radar is detected (S29). The radar detection determining unit 208 receives the determination result and determines that the radar is present in the second communication channel (S30). The radar detection determining unit 208 determines whether or not the communication channel currently in use is switched to another communication channel having different band (S31).

Upon switching to another communication channel (S31, YES), the radar detection determining unit 208 sends a command to the radio unit 202 and the communication data processor 204. Accordingly, the wireless communication device resumes the 40 MHz band communication using the different communication channel (S32). When there is no switching to another communication channel (S31, NO), the radar detection determining unit 208 changes the frequency band in use from the second frequency band to the first frequency band and determines to resume the wireless communication using the first communication channel only (S33). As a result, the wireless communication device 200 only resumes communication in the first frequency channel (S34).

The above process of steps S30 to S34 corresponds to that of steps S4 to S8 described in the first embodiment.

When it is determined that no radar signal is detected in the radar detecting unit 212 in step S21, the wireless communication continues without changing the frequency channel (S35).

Subsequently, in step S20, a case in which the filter 203f operates in the first frequency band mode will be described. In this case, the wireless communication device performs communication using the first communication channel only. The radar detecting unit 212 detects whether or not the radar is present in the first frequency band (S36).

If the radar detecting unit 212 detects the radar (S36, YES), the radar detection determining unit 208 instructs the communication data processor 204 to suspend the transmission of data (S37). The radar detection determining unit 208 detects the presence of radar in the first communication channel (S38) and performs switching to a different communication channel (S39). When it is determined that no radar is detected in step S36 (S36, NO), the wireless communication continues (S35).

As described above, according to the wireless communication device related to the second embodiment of the present invention, in addition to the advantage (1) described in the first embodiment, the following advantage (2) is obtained.

(2) A Circuit Size of the Wireless Communication Device Can Be Reduced.

According to the configuration related to the second embodiment, the filter 203f also functions as a filter for passing the 20 MHz bandwidth (the first frequency band mode) together with a filter for passing the 40 MHz bandwidth (the second frequency band mode). Upon radar detection in the 40 MHz bandwidth, the filter 203f operates in the second frequency band mode. Upon radar detection in the 20 MHz bandwidth, the filter 203f operates in the first frequency band mode. Therefore, the single radar detecting unit 212 can perform the same radar detection as in the first embodiment. As a result, a circuit size of the wireless communication device 200 can be reduced as compared with that of the first embodiment.

Third Embodiment

A wireless communication device and a signal detection circuit related to a third embodiment will now be described. The wireless communication device according to the third embodiment further performs radar detection in the second communication channel, in addition to those described in the second embodiment.

Since a configuration of the wireless communication device 200 related to the third embodiment is the same as shown in FIGS. 8 and 9, its description will be omitted. However, unlike the second embodiment, upon radar detection in the second frequency band, the radar detecting unit 212 instructs the filter 203f to transit to the second channel mode as well as the first channel mode.

Figure 11:
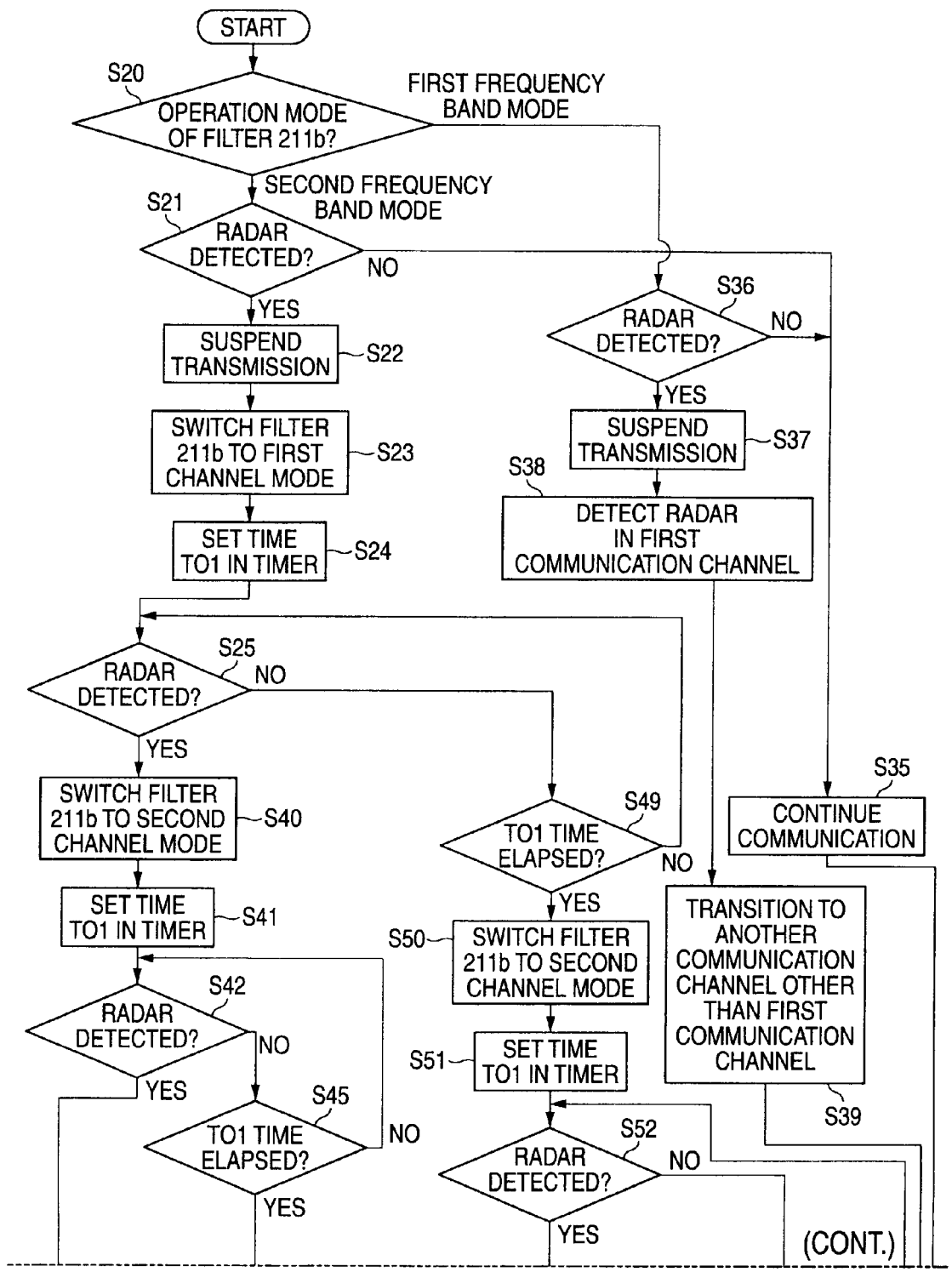
FIG. 11 is a flowchart showing an operation of the wireless communication device related to a third embodiment of the present invention.

In the wireless communication device 200 with the above configuration, details of an operation from radar detection to frequency conversion will be described with reference to FIG. 11.

First, the operations of steps S20 to S25 described in the second embodiment are performed. Since these operations are the same as those described in the second embodiment, repeated description thereof is omitted. Since the operations of steps S36 to S39 in the first frequency band mode in step S20 and the operation of step S35 in the determination of NO in step S21 are the same as those of the second embodiment, repeated description thereof is omitted.

In step S25, when the radar is detected (step S25, YES), the radar detecting unit 212 outputs the first detection signal. The radar detecting unit 212 commands the filter 203f to transit from the first channel mode to the second channel mode (S40). Accordingly, the filter 203f performs the second channel mode to pass the first frequency band (20 MHz) corresponding to the second channel. Thereafter, the radar detecting unit 212 sets the radar observation time TO1 in the timer (S41) and observes a radar signal (S42).

When the radar is detected in the second channel mode (step S42, YES), the radar detecting unit 212 outputs the first detection signal again. Upon receipt of its result, the radar detection determining unit 208 determines that the radar is present in both the first and second communication channels (step S43). Thus, the radar detection determining unit 208 is switched to a communication channel different from the first and second communication channels (S44). The process of steps S43 and S44 corresponds to the steps S11 and S12 described in the first embodiment.

The radar detection in step S42 continues until the radar observation time TO1 elapses (S42, NO, S45, NO). When no radar is detected after the time TO1 elapsed (S45, YES), the radar detecting unit 212 determines that no radar is detected (S46). Upon receipt of its result, the radar detection determining unit 208 determines that the radar is present in the first communication channel only (S47). Thus, the radar detection determining unit 208 switches the communication channel currently in use to another communication channel (S48).

In step S25, when no radar is detected (step S25, NO, step S49, YES), the radar detecting unit 212 does not output the first detection signal. The radar detecting unit 212 commands the filter 203f to transit from the first channel mode to the second channel mode (S50). Accordingly, the filter 203f performs the second channel mode to pass the first frequency band (20 MHz bandwidth) corresponding to the second channel. Thereafter, the radar detecting unit 212 sets the radar observation time TO1 in the timer (step S51) and observes a radar signal (S52).

When the radar is detected in the second channel mode (step S42, YES), the radar detecting unit 212 outputs the first detection signal again. Upon receipt of its result, the radar detection determining unit 208 determines that the radar is present in the second communication channel only (S53). The radar detection determining unit 208 determines whether or not to switch the communication channel currently in use to a communication channel of another frequency band (S54).

Upon switching to another communication channel (S54, YES), the radar detection determining unit 208 sends its command to the radio unit 202 and the communication data processor 204. Accordingly, the wireless communication device resumes the 40 MHz band communication using the different communication channel (S55). When there is no switching to another communication channel (S54, NO), the radar detection determining unit 208 changes the frequency band in use from the second frequency band to the first frequency band and determines to resume the wireless communication using the first communication channel only (S56). As a result, the wireless communication device 200 resumes communication in the first frequency channel only (S57). The process of steps S54 to S57 corresponds to steps S30 to S34 described in the second embodiment.

The radar detection in step S52 continues until the radar observation time TO1 elapses (S52, NO, 558, NO). When no radar is detected after the time TO1 elapsed (S58, YES), the radar detecting unit 212 determines that no radar is detected (S46). This corresponds to a case in which no radar is detected in either the first communication channel or the second communication channel. However, since it is determined that the radar is detected in step S21, the radar detection determining unit 208 determines that the radar is present in the first communication channel and the second communication channel in consideration of such determination (S59). Consequently, the radar detection determining unit 208 determines whether or not to switch the communication channel currently in use to a communication channel of another frequency band (S60).

As described above, according to the wireless communication device related to this embodiment of the present invention, in addition to the advantages (1) and (2) described in the first and second embodiments, the following advantage (3) is obtained.

(3) The Radar Can Be Detected More Accurately.

According to the wireless communication device related to the third embodiment, when the filter 203f is in the second frequency band mode and the radar is detected, the radar detection is performed by setting the filter 203f to the second channel mode as well as the first channel mode.

That is, the radar detection is first performed in the 40 MHz bandwidth, the radar detection is next performed in the 20 MHz bandwidth (the first communication channel) of a low frequency side of the 40 MHz bandwidth, and the radar detection is further performed in the 20 MHz bandwidth (the second communication channel) of a high frequency side thereof. Thus, the radar is detected more correctly using the configuration the same as the second embodiment.

Fourth Embodiment

A wireless communication device and a signal detection circuit related to a fourth embodiment of the present invention will now be described. The fourth embodiment removes the filter from the receiver 213 by providing the filter in the radar detecting unit described in the second and third embodiment.

Figure 12:
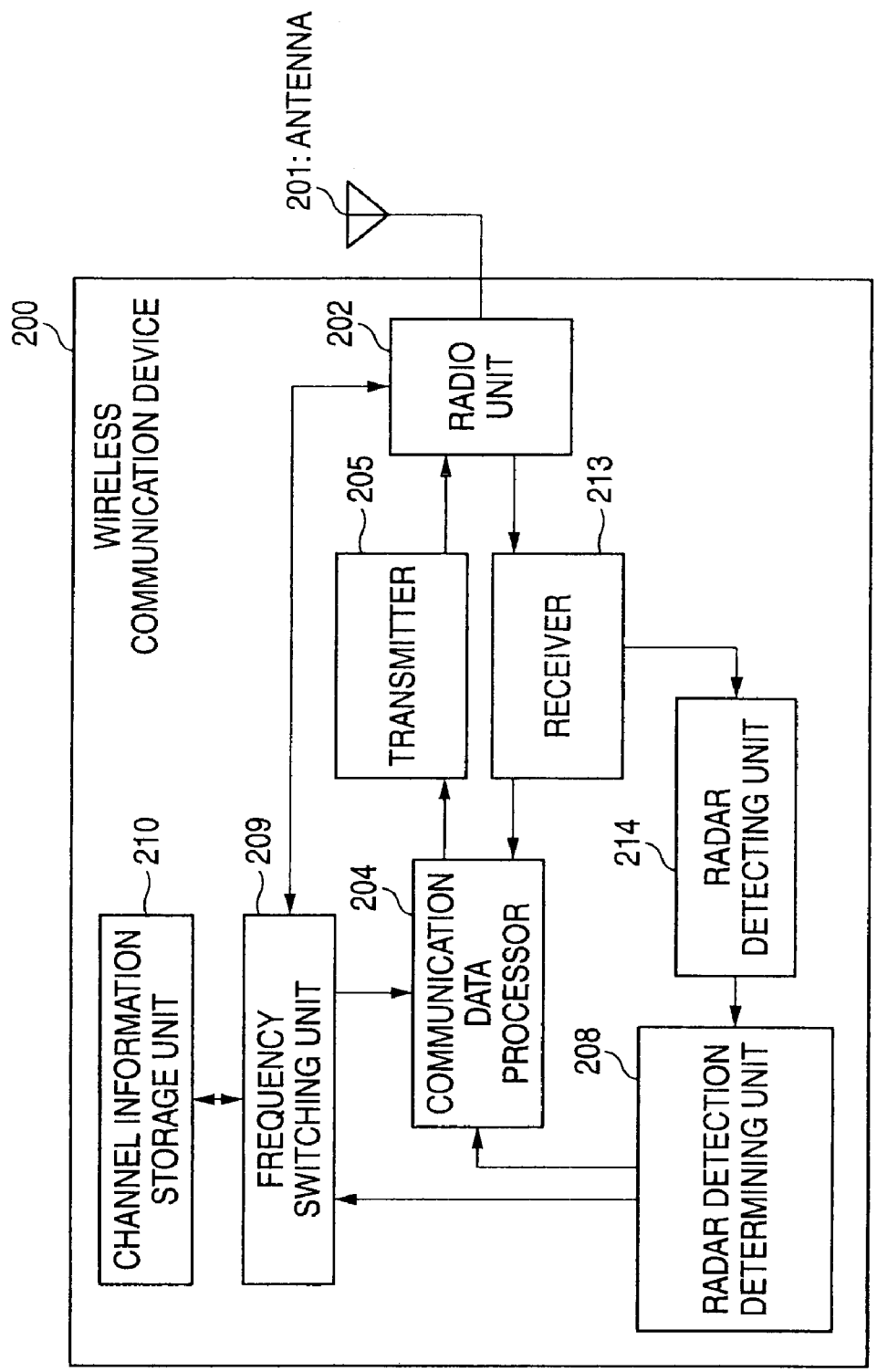
FIG. 12 is a block diagram of the wireless communication device related to a fourth embodiment of the present invention.

FIG. 12 is a block diagram of the wireless communication device 200 related to this embodiment. As shown, the basic configuration is the same as those of the second and third embodiments. However, since internal configurations of the receiver and the radar detecting unit are different from those of the second and third embodiments, they are referred to as "receiver 213" and "radar detecting unit 214", hereinafter, respectively.

Figure 13:
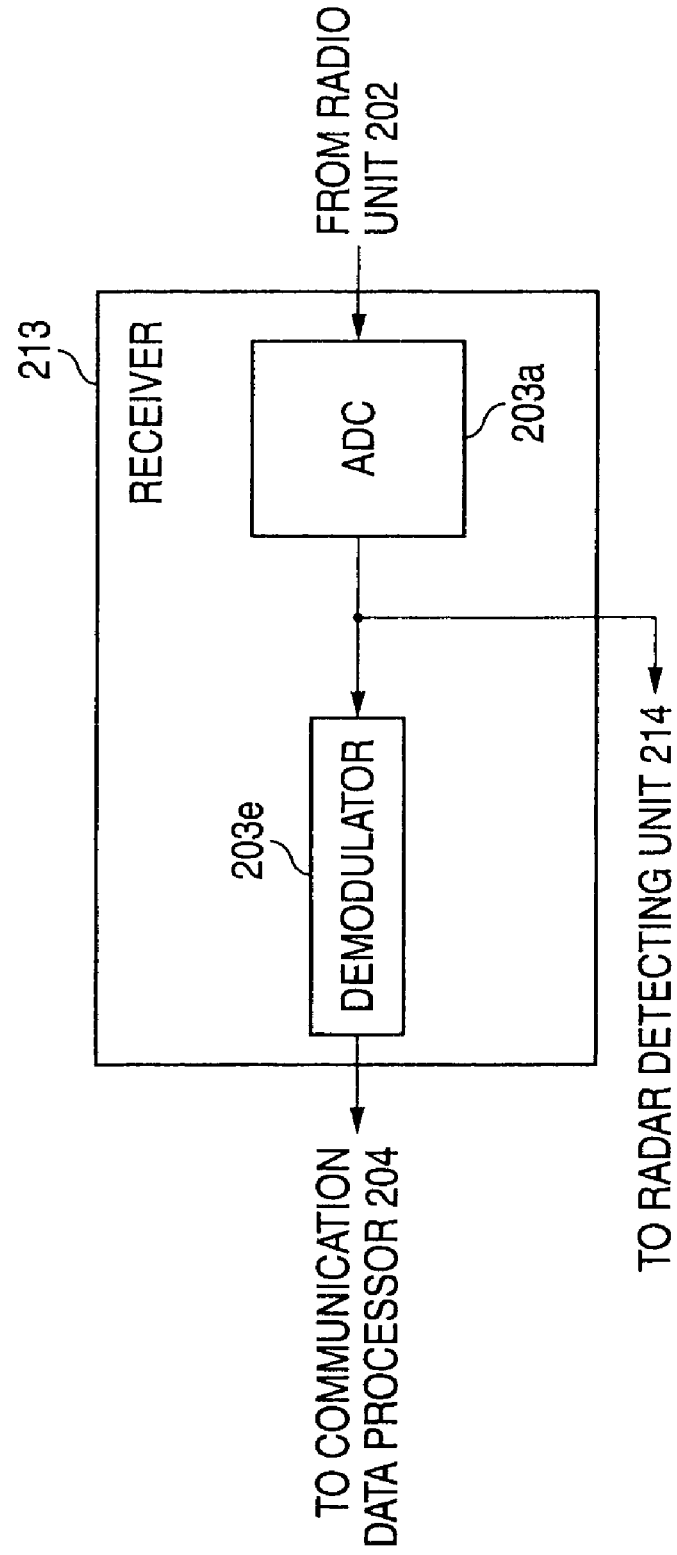
FIG. 13 is a block diagram of a receiver included in the wireless communication device related to the fourth embodiment.

FIG. 13 is a block diagram of the receiver 213 related to this embodiment. As shown, the receiver 213 has a configuration of removing the filter 203f from the configuration of FIG. 9 described in the second embodiment. Thus, the digital signals from the ADC 203a directly input to the radar detecting unit 214. The baseband signal is converted into the digital signal by the ADC 203a to be divided into an imaginary number portion and a real number portion.

Figure 14:
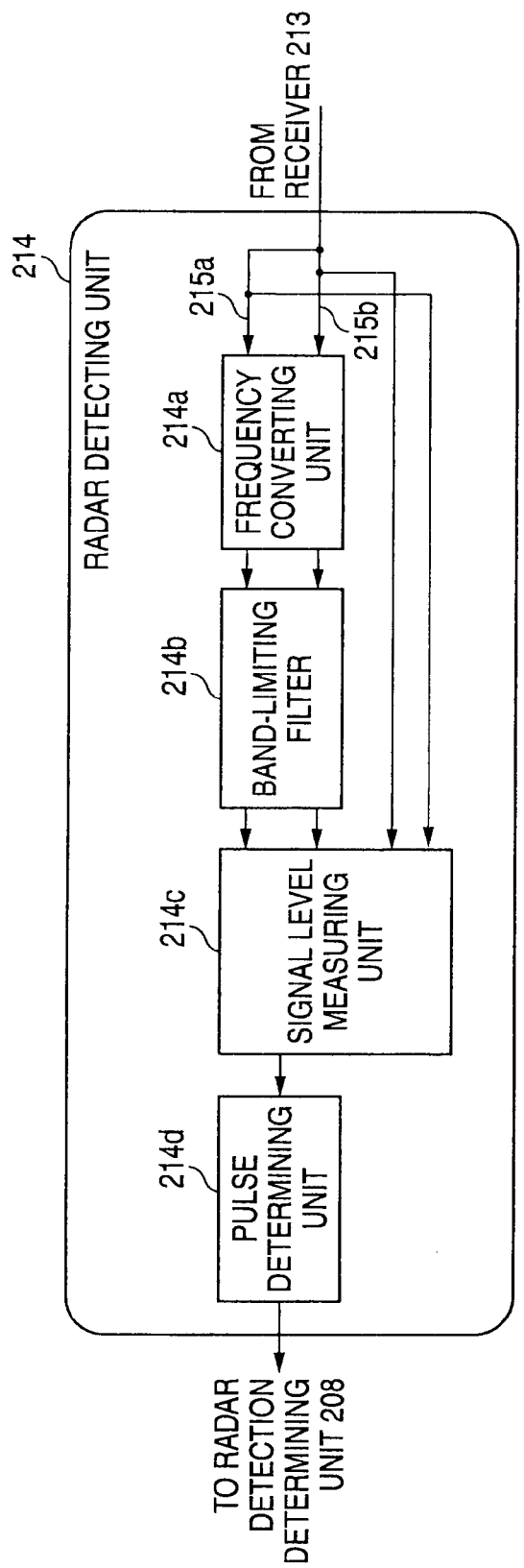
FIG. 14 is a block diagram of a radar detecting unit included in the wireless communication device related to the fourth embodiment.

FIG. 14 is a block diagram of the radar detecting unit 214 related to this embodiment. As shown, the radar detecting unit 214 includes a frequency converting unit 214a, a band-limiting filter 214b, a signal level measuring unit 214c, and a pulse determining unit 214d.

The frequency converting unit 214a performs frequency-conversion of the digital signal sent from the ADC 203a. More in detail, a frequency of the digital signal is shifted in a plus direction and a minus direction by a predetermined value. The band-limiting filter 214b passes some components of the digital signal of which the frequency is converted in the frequency converting unit 214a, for output to the signal level measuring unit 214c. The signal level measuring unit 214c measures the intensity of the digital signal sent from the ADC 203a and the digital signal filtered in the band-limiting filter 214b. The pulse determining unit 214d determines whether or not a pulse signal is present, that is, whether or not the radar is present, based on the measurement result by the signal level measuring unit 214c.

Figure 15:
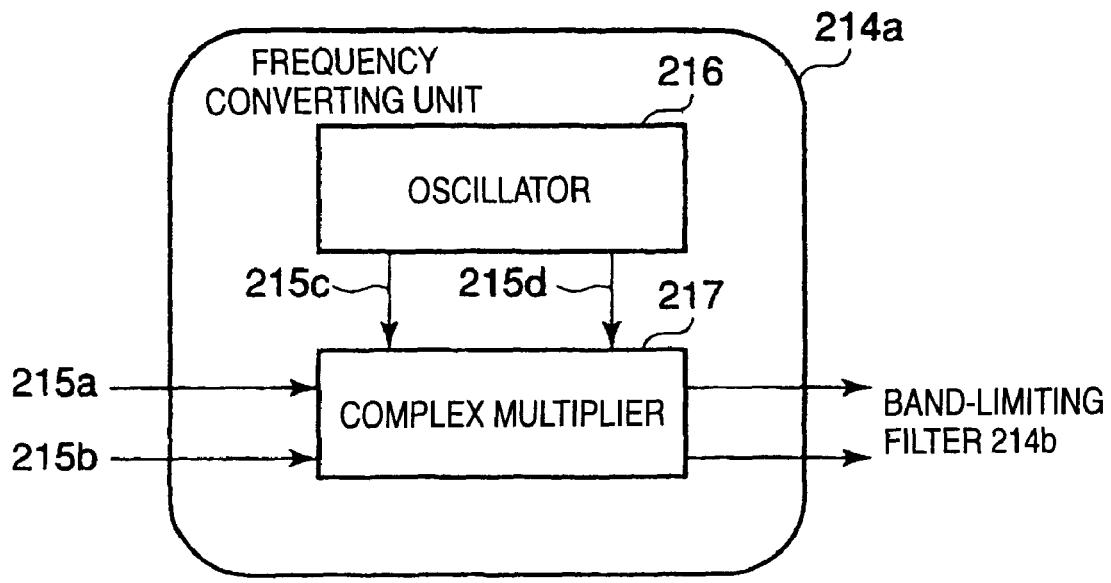
FIG. 15 is a block diagram of a frequency converting unit included in the wireless communication device related to the fourth embodiment.

FIG. 15 is a block diagram showing an internal configuration of the frequency converting unit 214a. As shown, the frequency converting unit 214a includes an oscillator 216 and a complex multiplier 217. The oscillator 216 generates an oscillation signal with a predetermined oscillation frequency f1. A real part of the oscillation signal is referred to as "real part 215c" and an imaginary part thereof is referred to as "imaginary part 215d".

The complex multiplier 217 multiplies the real part 215a and the imaginary part 215b and the digital signal by the real part 215c and the imaginary part 215d of the oscillation signal output from the oscillator 216. As a result, the frequency of the digital signal is converted.

Subsequently, an operation of the radar detecting unit 214 will be described in detail.

Figure 16:
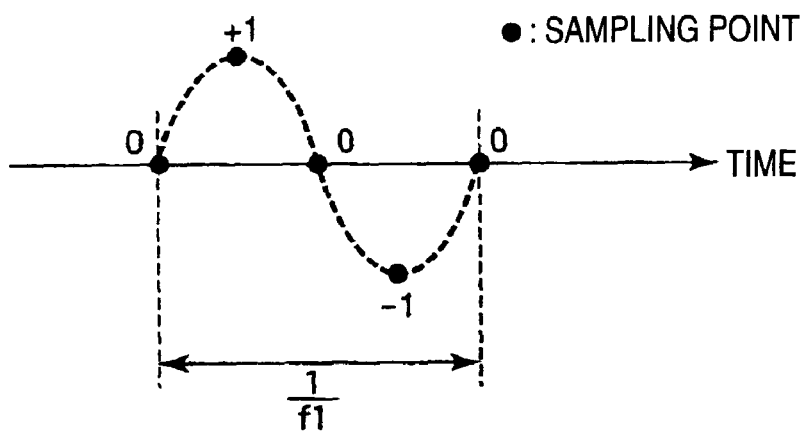
FIG. 16 shows waveforms of a sine wave generated from the oscillator included in the wireless communication device related to the fourth embodiment.

First, the frequency converting unit 214a will be described. The oscillation frequency f1 of the oscillation signal generated from the oscillator 216 described in FIG. 15 is ±10 MHz, for example. That is, the frequency converting unit 214a shifts the frequency of the digital signal from the ADC 203a to a plus direction by 10 MHz and shifts it to a minus direction by 10 MHz. The oscillation signal is sampled by a sampling frequency, for example, f2=40 MHz, in the oscillator 216. The oscillation signal sampled by the f2 is sent to the complex multiplier 217. Additionally, in a relation between the oscillation frequency f1 and the sampling frequency f2, a ratio of absolute values of both may be one over power exponentiation of 2, that is, $|f1|/|f2|=\frac{1}{2}^n$ (where n is a natural number). With this, only values of "0", "1", and "−1" of sine wave representing the imaginary part 215d of the oscillation signal is generated from the oscillator 216. This is shown in FIG. 16. FIG. 16 shows waveforms of the imaginary part 215d of the oscillation signal. As shown, the frequency of the sine wave is 10 MHz, and, as a result of the sampling frequency of 40 MHz, four values per one period ("0", "1", "0", and "−1") is generated from the oscillator 216.

Figure 17A:
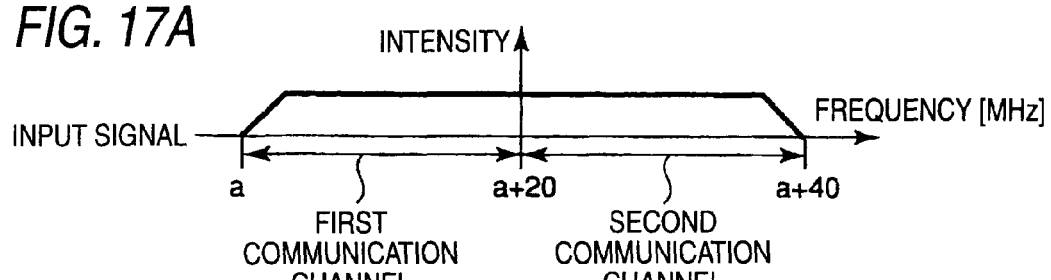
Figure 17B:
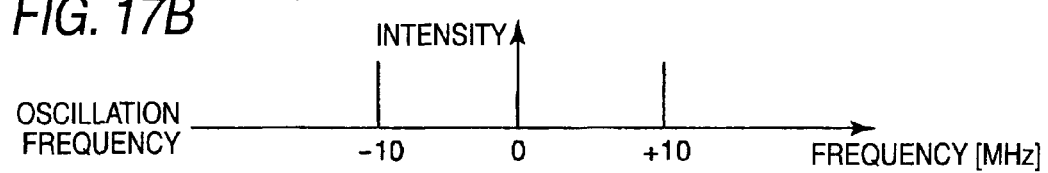
Figure 18A:
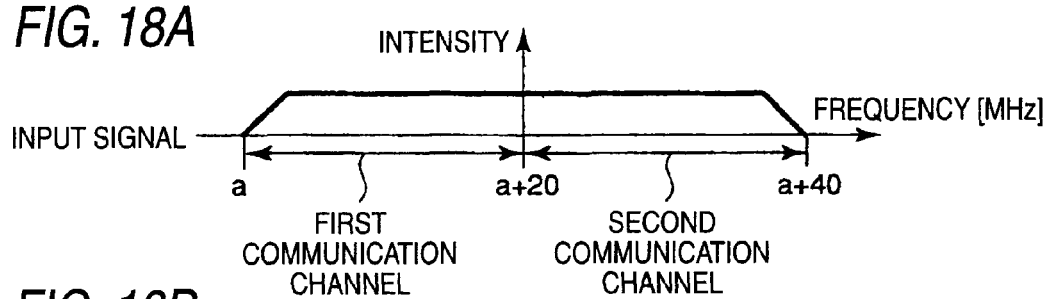
Figure 18B:
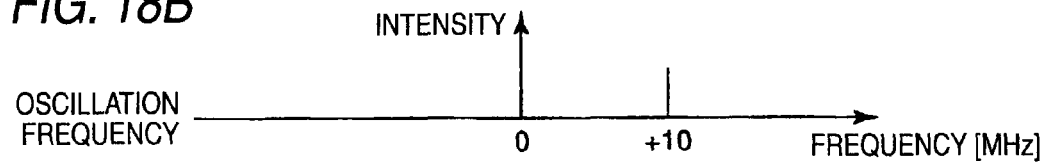
Figure 18C:
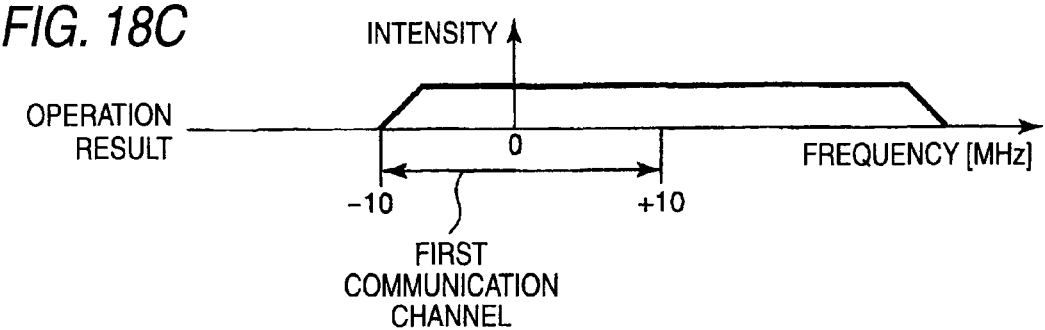

The real part 215a and the imaginary part 215b of the digital signal are multiplied by the real part 215c and the imaginary part 215d of the oscillation signal in the complex multiplier 217. As a result, the frequency of the digital signal is shifted by ±10 MHz. The frequency conversion will be described by referring to FIG. 17A-19C. FIG. 17A is a graph showing a frequency distribution of the digital signal, and FIG. 17B is a graph showing a frequency spectrum of the oscillation frequency of the oscillation signal. FIGS. 18A and 19A are graphs showing a frequency distribution of the digital signal, wherein FIGS. 18B and FIG. 19B are graphs showing a frequency spectrum of the oscillation frequency of the oscillation signal, and wherein FIGS. 18C and 19C are graphs showing a frequency distribution of a multiplication result in the complex multiplier 217. Although FIGS. 17A to 19A show the bandwidth of the digital signal as 40 MHz, this is for simplicity of explanation. Thus, digital signals with bands of more than 40 MHz is possible, which is typical.

The digital signal as shown in FIG. 17A is assumed to be input to the complex multiplier 217. In other words, the bandwidth is 40 MHz, 20 MHz of a low frequency side thereof is used as the first communication channel, and 20 MHz of a high frequency side thereof is used as the second communication channel. A central frequency of the digital signal corresponds to a border between the first communication channel and the second communication channel. The oscillation frequency f1 of the oscillation signal generated from the oscillator 216 is +10 MHz and −10 MHz as shown in FIG. 17B, which is properly selectable.

A case of the oscillation frequency f1 of +10 MHz will be described using FIGS. 18A to 18C. Multiplication of the oscillation frequency f1 of +10 MHz by the digital signal shifts the frequency by +10 MHz as shown in FIG. 18C. In other words, the first communication channel lies between −10 MHz and +10 MHz.

A case of the oscillation frequency f1 of −10 MHz will be described using FIGS. 19A to 19C. Multiplication of the oscillation frequency f1 of −10 MHz by the digital signal shifts the frequency by −10 MHz as shown in FIG. 19C. In other words, the second communication channel lies between −10 MHz and +10 MHz.

The digital signal, as shown in FIGS. 18C and 19C, obtained by the frequency conversion as described above, is sent to the band-limiting filter 214b. In the above description, it is assumed a case in which the oscillation frequency f1 is ±10 MHz, and shifting the frequency by ±10 MHz. However, when the relation with the sampling frequency is a reciprocal of a power of two, it is not limited to ±10 MHz, and for example, ±20 MHz may also be possible. In this case, a shift amount of the frequency is set to ±20 MHz.

The band-limiting filter 214b will be described in detail. FIG. 20 is a graph showing a frequency characteristic of the band-limiting filter 214b, in which the transverse axis represents a frequency and the longitudinal axis represents a transmittance of the signal. In addition, although FIG. 20 shows only a region of positive side for simplicity, the same characteristic is present in a negative side as well. As shown, the band-limiting filter 214b has 10 MHz as an absolute value of a cutoff frequency and is a low-pass filter having the same value as the oscillation frequency f1. The absolute value of the cutoff frequency is not limited to 10 MHz, only if it has the same as the oscillation frequency. The band-limiting filter 214b related to this embodiment is a low pass filter using a roll-off filter.

Therefore, for the frequency-converted digital signal by the frequency converting unit 214a, the band-limiting filter 214b extracts components of ±10 MHz apart from the central frequency. This will be described using FIGS. 21A and 21B. FIGS. 21A and 21B are graphs showing the frequency-converted digital signal and a frequency band filtered in the band-limiting filter 214b, respectively, FIG. 21A shows a case in which the oscillation frequency f1 of the oscillator 216 is +10 MHz, and FIG. 21B shows a case in which the oscillation frequency f1 of the oscillator 216 is −10 MHz.

As shown in FIG. 21A, when the oscillation frequency f1 is +10 MHz and thus the frequency of the digital signal is shifted by +10 MHz, as described above, a component between the central frequency and −20 MHz apart therefrom, that is, the first communication channel lies between −10 MHz and +10 MHz. Thus, the band-limiting filter 214b passes only a component corresponding to the first communication channel, of the digital signal.

In addition, as shown in FIG. 21B, when the oscillation frequency f1 is −10 MHz and thus the frequency of the digital signal is shifted by −10 MHz, as described above, a component between the central frequency and +20 MHz apart therefrom, that is, the second communication channel lies between −10 MHz and +10 MHz. Thus, the band-limiting filter 214b passes only a component corresponding to the second communication channel, of the digital signal.

The signal level measuring unit 214c will be described. The digital signal passed through the band-limiting filter 214b or the digital signal directly sent from the ADC 203a of the receiver 214 is inputs to the signal level measuring unit 214c to measure the intensity thereof. The signal level measuring unit 214c measures the signal level (intensity) of the digital signal by performing the following calculation.

$$\Sigma(I^2+Q^2)$$

In the above calculation, I is a real part of the digital signal and Q is an imaginary part thereof.

The pulse determining unit 214d will be described. The pulse determining unit 214d determines whether the corresponding digital signal has a pulse, based on the measured intensity in the signal level measuring unit 214c. If the corresponding signal is determined to have a pulse, the pulse determining unit 214d determines that the corresponding digital signal includes the radar. An example of methods of determining whether the corresponding digital signal has a pulse will be described with reference to FIG. 22. FIG. 22 is a graph showing a time variation in the intensity of the digital signal.

For example, when the signal intensity I1 is focused, the corresponding digital signal is determined to have a pulse if I1 is 10 dB greater than the signal intensity I2 at the time of 3 µs prior to an observation time point of I1 and is 10 dB greater than the signal intensity I3 at the time of 10 µs posterior to the observation time point of the I1.

Figure 23:
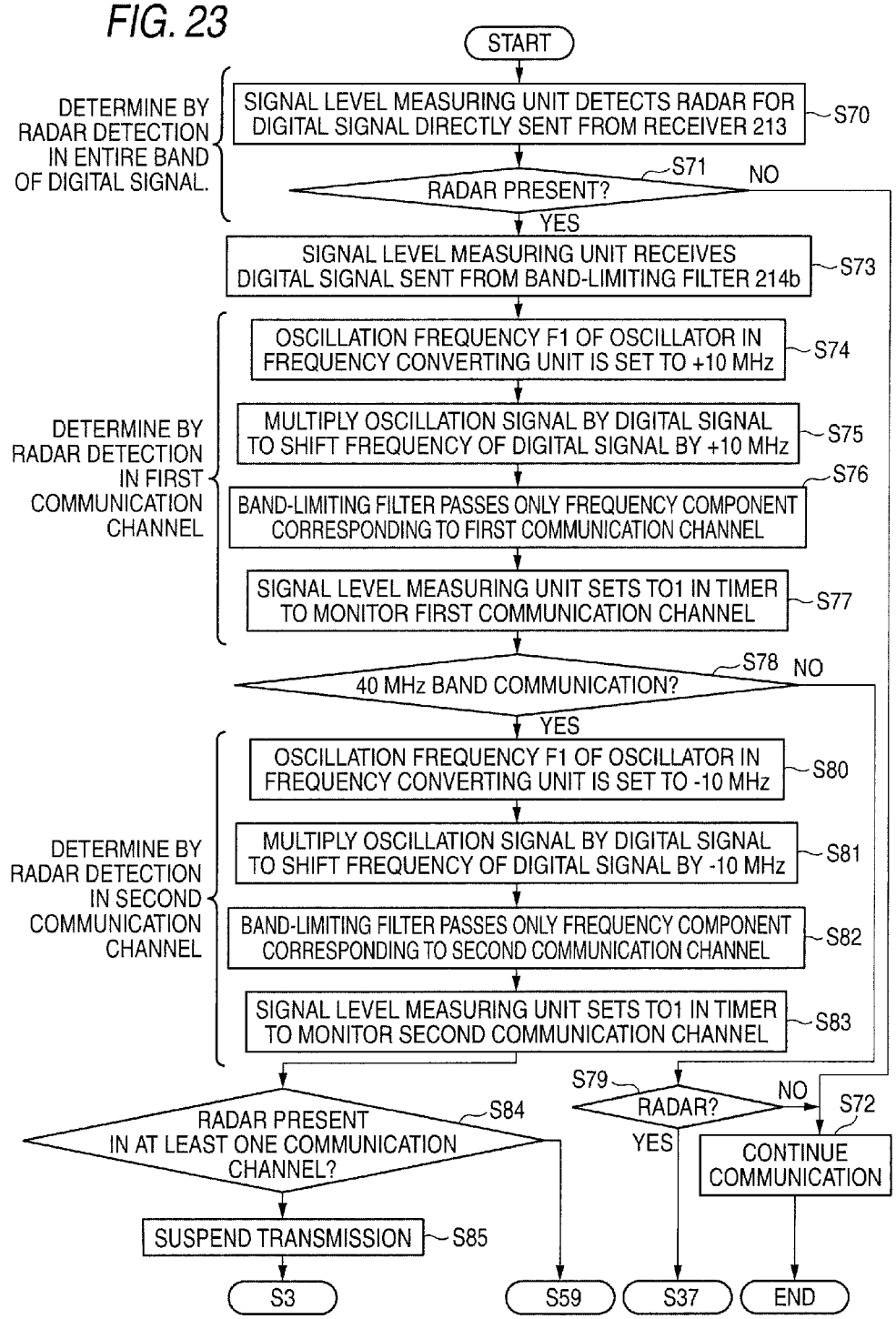
FIG. 23 is a flowchart showing an operation of the wireless communication device related to the fourth embodiment.

A method of detecting radar in the wireless communication device 200 with the above-described configuration will be described in detail with reference to FIG. 23. FIG. 23 is a flowchart showing an operation flow of the wireless communication device 200.

The signal level measuring unit 214c receives the digital signal directly sent from the ADC 203a of the receiver 213. The signal level measuring unit 214c measures the received digital signal, and the pulse determining unit 214d determines whether or not the radar is present based on the measured intensity (S70). In the configuration related to this embodiment, a filter is not provided in the receiver 213 unlike those of the first to third embodiments. Thus, in step S70, radar detection is performed in the entire band of the digital signal.

As a result of step S70, when the pulse determining unit 214d determines that no radar is present (S71, NO), the communication continues (S72). On the other hand, as a result of step S70, when the pulse determining unit 214d determines that the radar is present (S71, YES), the signal level measuring unit 214c receives the digital signal sent from the band-limiting filter 214b (S73). The signal level measuring unit 214c detects the radar in the first communication channel with respect to the digital signal send from the band-limiting filter 214b.

In other words, the oscillation frequency f1 of the oscillator 216 in the frequency converting unit 214a is set to +10 MHz (S74). Then, the complex multiplier 217 multiplies the oscillation signal by the digital signal to shift the frequency of the digital signal by +10 MHz (S75). The processes in steps S74 and S75 are the same as those described using FIGS. 18A to 18C.

The band-limiting filter 214b passes only a frequency component corresponding to the first communication channel, of the frequency-converted digital signal (S76). The process in step S76 is the same as that described with reference to FIG. 21A. The signal level measuring unit 214c sets the radar observation time TO1 in the timer to measure the intensity of the digital signal sent from the band-limiting filter 214b during the time TO1. That is, it measures the intensity of the frequency component corresponding to the first communication channel (S77).

In this case, when the wireless communication device 200 performs communication in the 20 MHz band (S78, NO), the operation proceeds from the step where the pulse determining unit 214d determines that radar is present (S79, YES) to step S37 described in the second embodiment. That is, the communication is changed into a communication using another communication channel. On the other hand, if radar is determined not to be present (S79, NO), the operation proceeds to step S72, and the communication continues.

When the wireless communication device 200 performs communication in the 40 MHz band (S78, YES), the radar detecting unit 214 detects radar in the second communication channel subsequently.

That is, the oscillation frequency f1 of the oscillator 216 in the frequency converting unit 214a is set to −10 MHz (S80). The complex multiplier 217 multiplies the oscillation signal by the digital signal to shift the frequency of the digital signal by −10 MHz (S81). The processes in steps S74 and S75 are the same as those described using FIGS. 19A to 19C.

The band-limiting filter 214b passes only a frequency component corresponding to the second communication channel, of the frequency-converted digital signal (S82). The process in step S82 is the same as that described with reference to FIG. 21B. The signal level measuring unit 214c sets the radar observation time TO1 in the timer to measure the intensity of the digital signal sent from the band-limiting filter 214b during the time TO1. That is, it measures the intensity of the frequency component corresponding to the second communication channel (S83).

If radar is present in at least one communication channel, that is, if radar is determined to be present at least one of the steps S77 and S83 (S84, YES), the radar detection determining unit 207 instructs the communication data processor to suspend the transmission of data (S85). Thereafter, step S3 described in the first embodiment is performed. In this embodiment, the first detection signal ="1" in step S3 corresponds to a case in which radar is determined to be present in the first communication channel (step S77). The second detection signal="1" corresponds to a case in which radar is determined to be present in the second communication channel (S83).

If radar is determined not to be present in step S84, step S59 described in the third embodiment is performed.

As described above, according to the wireless communication device related to the fourth embodiment, the following advantages (4) to (7) are obtained.

(4) The Communication Frequency Can Be Used Effectively.

According to the wireless communication device 200 related to this embodiment, in the wireless communication device capable of communicating in the both bands of the MHz bandwidth and the 40 MHz bandwidth, the radar detecting unit 214 is performing radar detection in a unit of 20 MHz bandwidth. More in detail, the band-limiting filter 214b limits the digital signal to a band with a passing bandwidth of 20 MHz (±10 MHz), thereby detecting radar. Thus, if radar is detected, it can be grasped where the corresponding radar is present of the first communication channel and the second communication channel. Accordingly, similar to the effect (1) described in the first embodiment, an efficiency of use of the frequency increases. In addition, when the 20 MHz band communication is performed using the first communication channel only, and, since change of the communication channel is unnecessary, decrease of operation speed of the wireless communication device 200 can be prevented.

(5) A Characteristic of the Radar Detecting Unit 214 Can Be Increased.

In this embodiment, the baseband received signal is converted from the analog signal to the digital signal in the ADC 213a provided in the receiver 213. It is detected whether radar is in such digital signal.

If radar is to be detected from the analog signal, a circuital configuration and an operation of the circuit for detecting radar is more complicated than those using the digital signal. Because, upon use of the analog signal, a complicated operation of the complex number is an RF circuit is performed to change the central frequency and the passing band, thereby making narrow the frequency channel where radar is present.

As compared with this, by using the digital signal, the radio signal is divided into the real part and the imaginary part to facilitate operation of the complex number. The frequency conversion is performed only by multiplying the oscillation signal from the oscillator 216 by the digital signal, and thus the processing time decrease as well as the correctness increase.

(6) A Circuit Size of the Wireless Communication Device Can Be Reduced.

In the fourth embodiment, the relation of the oscillation frequency f1 and the sampling frequency f2 of s the oscillation signal in the oscillator 216 is designed to satisfy $|f1|/|f2|=\frac{1}{2^n}$. For example, f1=±10 MHz, and f2=40 MHz. As a result, values of the sampling points in the imaginary part of the oscillation signal are simplified into "0", "+1", and "−1".

Thus, the configuration of the oscillator 216 is simplified to reduce a circuit size of the wireless communication device 200. The simplification of values in the sampling points is connected to a high speed of operation of the frequency converting unit 214a.

As described above, since the relation between the oscillation frequency f1 and the sampling frequency f2 only has to be one overpower exponentiation of two, for example, For example, f1 may be ±20 MHz, and f2 may be 40 MHz. In this case, a value in the sampling point is only "0".

(7) A Circuit Size of the Wireless Communication Device Can Be Reduced.

According to the configuration related to the fourth embodiment, the cutoff frequency (±10 MHz) of the band-limiting filter 214b is the same as the oscillation frequency f1 in the oscillator 216. Therefore, the configuration of the band-limiting filter 214b can be simplified to reduce a circuit size of the wireless communication device 200.

In addition, as described in the above advantage (5), the radar detecting unit 214 can be reduced in a size by detecting radar from the digital signal. That is, upon use of the analog signal, an operation becomes complicated when the radio signal is divided into a positive frequency component and a negative frequency component, and an operator for complex number must be necessary. For this reason, a circuit size becomes larger. However, in this embodiment, since the central frequency is varied by using the digital signal, the band-limiting filter 214b adopts only a static digital filter to simplify a circuital configuration.

In the fourth embodiment, due to use of the digital filter, a static roll-off filter is used as the band-limiting filter 214b. An impulse response is designed not to have an unlimited length, by using the roll-off filter. Accordingly, "0" is present periodically in coefficients (tap weight) of the filter configuring the band-limiting filter 214b. Thus, an operation amount can be reduced in the band-limiting filter 214b to reduce a size of the band-limiting filter 214b.

Fifth Embodiment

Figure 24:
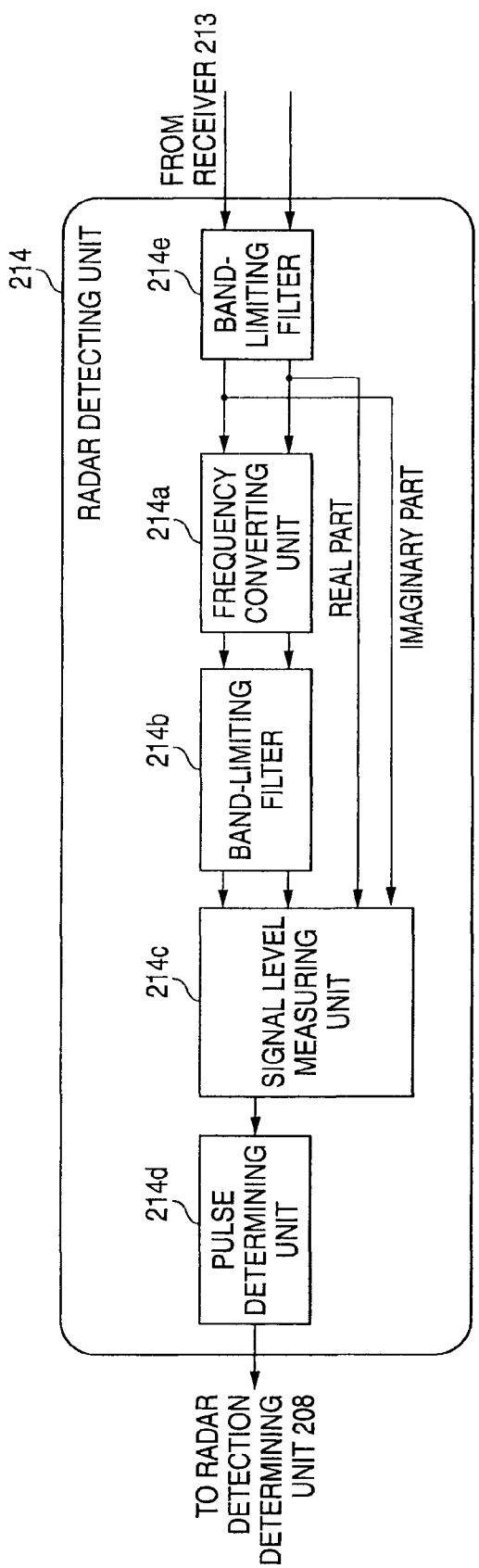
FIG. 24 is a block diagram of the radar detecting unit included in the wireless communication device related to a fifth embodiment of the present invention.

A wireless communication device and a signal detection circuit related to a fifth embodiment of the present invention will now be described. The fifth embodiment provides a further band-limiting filter 214e in front stage of the frequency converting unit 214a of the radar detecting unit in the fourth embodiment. FIG. 24 is a block diagram of the radar detecting unit 214 related to the fifth embodiment.

As shown in FIG. 24, the radar detecting unit 214 related to the fifth embodiment further includes the band-limiting filter 214e in the configuration of FIG. 14 described in the fourth embodiment. The band-limiting filter 214e is configured to pass a frequency band of, for example, 40 MHz, which is wider than that of the band-limiting filter 214b.

The frequency converting unit 214a performs frequency-conversion of the digital signal filtered in the band-limiting filter 214e. The signal level measuring unit 214c performs level (intensity) measurement with respect to the digital signals filtered in the band-limiting filters 214b and 214e. The other configurations are the same as those of the fourth embodiment, and thus the description thereof will be omitted.

Figure 25:
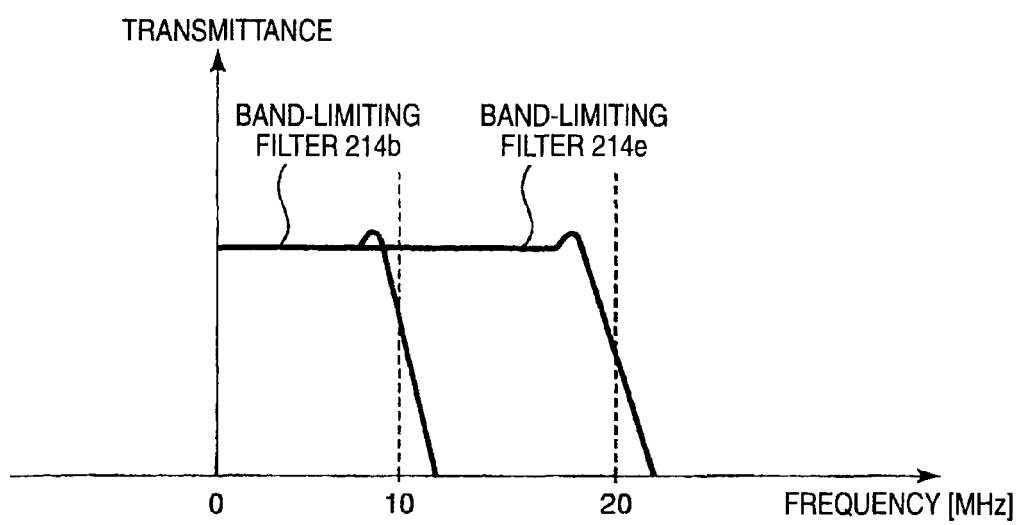
FIG. 25 is a graph showing a frequency characteristic the band-limiting filter included in the wireless communication device related to the fifth embodiment.

FIG. 25 is a graph showing frequency characteristics of the band-limiting filters 214b and 214e, in which the transverse axis represents a frequency and the longitudinal axis represents a transmittance of a signal. FIG. 25 shows only a positive region for simplicity, but the same characteristic is present in a negative region. As shown, the band-limiting filter 214b has 10 MHz as an absolute value of the cutoff frequency, which is the same as that of the fourth embodiment. As compared with this, the band-limiting filter 214e has, for example, 20 MHz, as the absolute value of the cutoff frequency.

Figure 26:
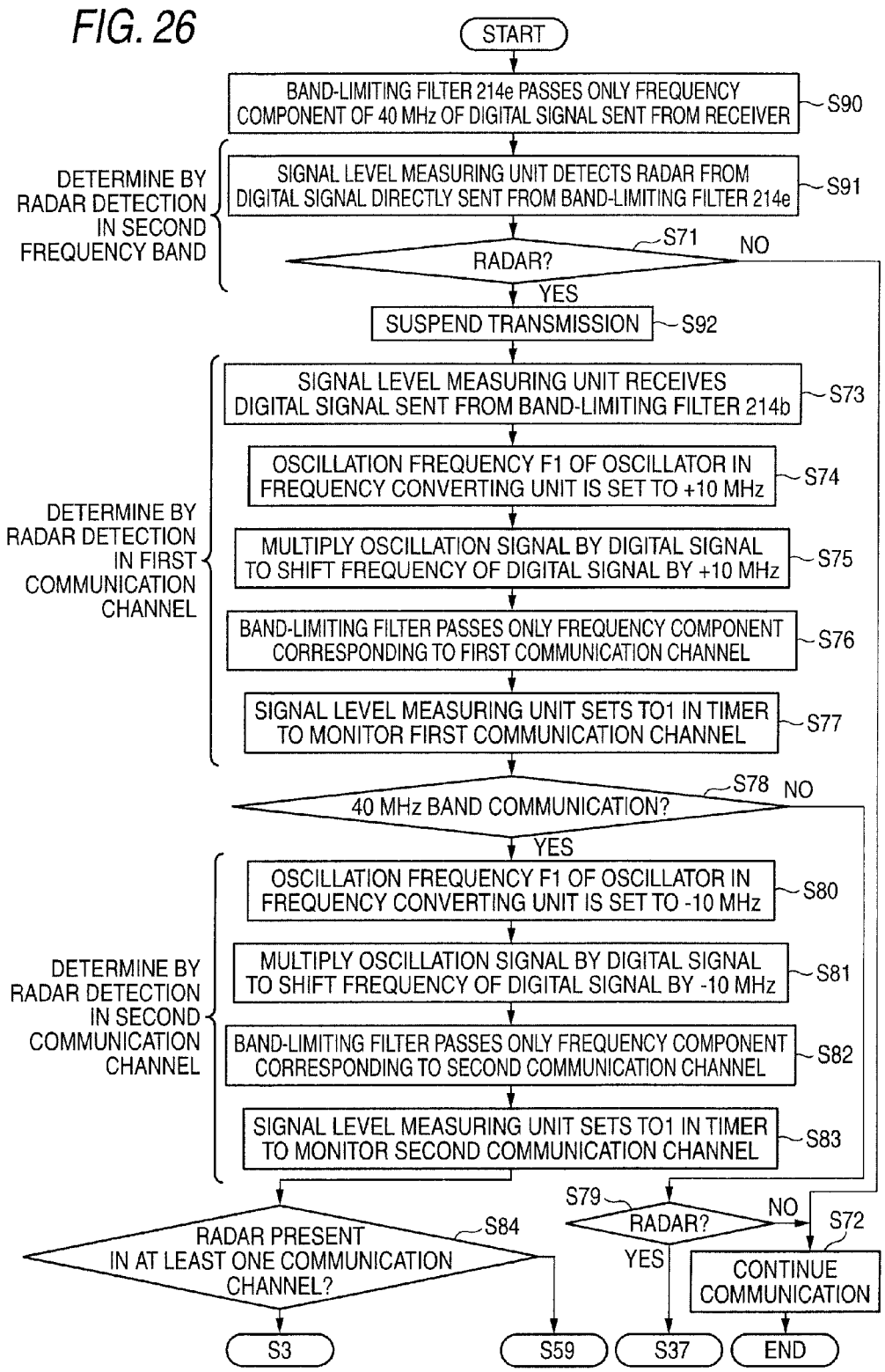
FIG. 26 is a flowchart showing an operation of the wireless communication device related to the fifth embodiment.

A method of detecting radar in the wireless communication device 200 related to the fifth embodiment will be described in detail with reference to FIG. 26. FIG. 26 is a flowchart showing an example of an operation flow of the wireless communication device 200.

As shown, the band-limiting filter 214e passes only a frequency component of 40 MHz (±20 MHz) of the digital signal sent from the ADC 203a of the receiver 213 (step S90).

The signal level measuring unit 214c receives the digital signal filtered in the band-limiting filter 214e. The signal level measuring unit 214c measures the received digital signal, and the pulse determining unit 214d determines whether or not the radar is present based on the measured intensity (S91). In other words, the radar is detected in the second frequency band filtered in the band-limiting filter 214e.

As a result of step S91, if the pulse determining unit 214d determines there is no radar (S71, NO), the communication continues (S72). On the other hand, as a result of step S91, if the pulse determining unit 214d determines there is the radar (S71, YES), the radar detection determining unit 208 instructs the communication data processor 204 to suspend the transmission of data (step S92). Thereafter, step S73 is performed as described in the fourth embodiment and the same process is performed as that of the fourth embodiment (see FIG. 23). However, step S85 is unnecessary in FIG. 23, because this process is completed in step S92.

As described above, according to the wireless communication device 200 related to the fifth embodiment of the present invention, the following advantage (8) in addition to the advantages (4)-(7) described in the fourth embodiment.

(8) An Efficiency of Detecting Radar Can Be Increased.

According to the configuration of the fifth embodiment, the band-limiting filter 214e having a wider band than the band-limiting filter 214b is provided in front of the band-limiting filter 214b. Thus, in step S91, the frequency band to be detected in the signal level measuring unit 214c and the pulse determining unit 214d becomes narrower than that in the fourth embodiment. For this reason, if radar is determined to be present in step S91, a possibility increases in that radar is present in the frequency band currently in use.

For example, as described in the above embodiment, when the bandwidth that the band-limiting filter 214e passes is set to 40 MHz, which is equal to the second frequency band, upon determination of presence of radar in step S91, and, when the 40 MHz bandwidth communication is performed, the radar is detected to be present in the frequency band currently in use. In other words, if radar is present in a frequency band other than the frequency band currently in use, the processes subsequent to step S92 are not required. Thus, radar detection efficiency is improved. The number of unnecessary radar detection processes can be reduced in the radar detecting unit 214.

In addition, the band-limiting filter 214e may have a bandwidth of at least 40 MHz, for example, a passing band including another frequency channel adjacent thereto.

Sixth Embodiment

Figure 27:
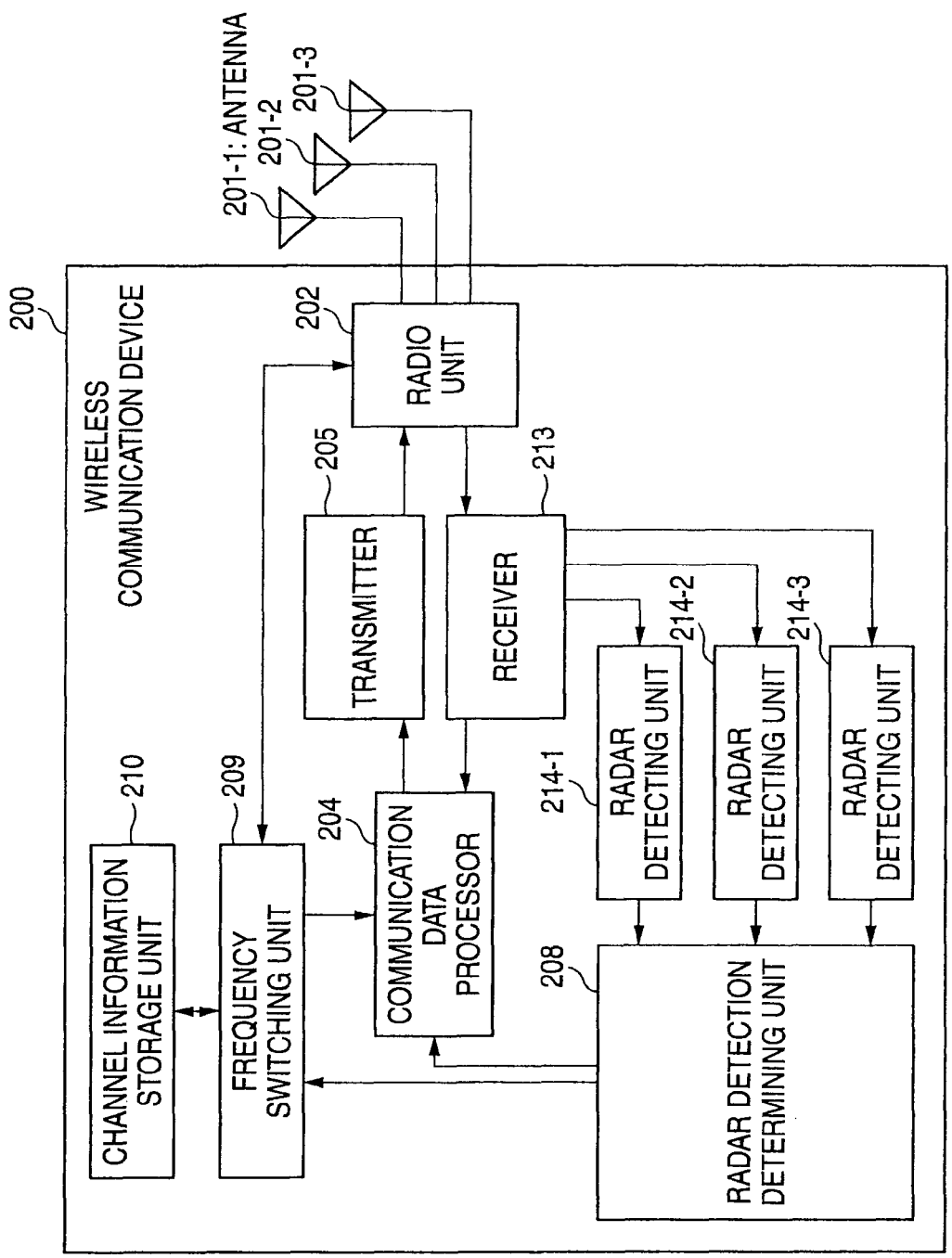
FIG. 27 is a block diagram of the wireless communication device related to a sixth embodiment.

A wireless communication device and a signal detection circuit related to a sixth embodiment of the present invention will now be described. The sixth embodiment provides a plurality of radar detecting units as those described in the fifth embodiment. FIG. 27 is a block diagram of the wireless communication device 200 related to the sixth embodiment.

As shown, the wireless communication device 200 is provided with three radar detecting units 214-1 to 214-3, in addition to the configuration shown in FIG. 12 and described in the fourth embodiment. The wireless communication device 200 includes three antennas 201-1 to 201-3 corresponding to three radar detecting units 214-1 to 214-3. The radio signals received from the antennas 201-1 to 201-3 are supplied to the radar detecting units 214-1 to 214-3 via the receiver 213.

Each of the radar detecting units 214-1 to 214-3 is configured as such shown in FIG. 24, which is described in the fifth embodiment. The radar detecting unit 214-1 detects the radar in the first communication channel and the radar detecting unit 214-2 detects the radar in the second communication channel. The radar detecting unit 214-3 is provided in the wireless communication device as a spare unit. The basis operation of the wireless communication device 200 related to the sixth embodiment is the same as those of the fourth and fifth embodiments, and thus, different points from the fourth and fifth embodiments will now be described.

Figure 28:
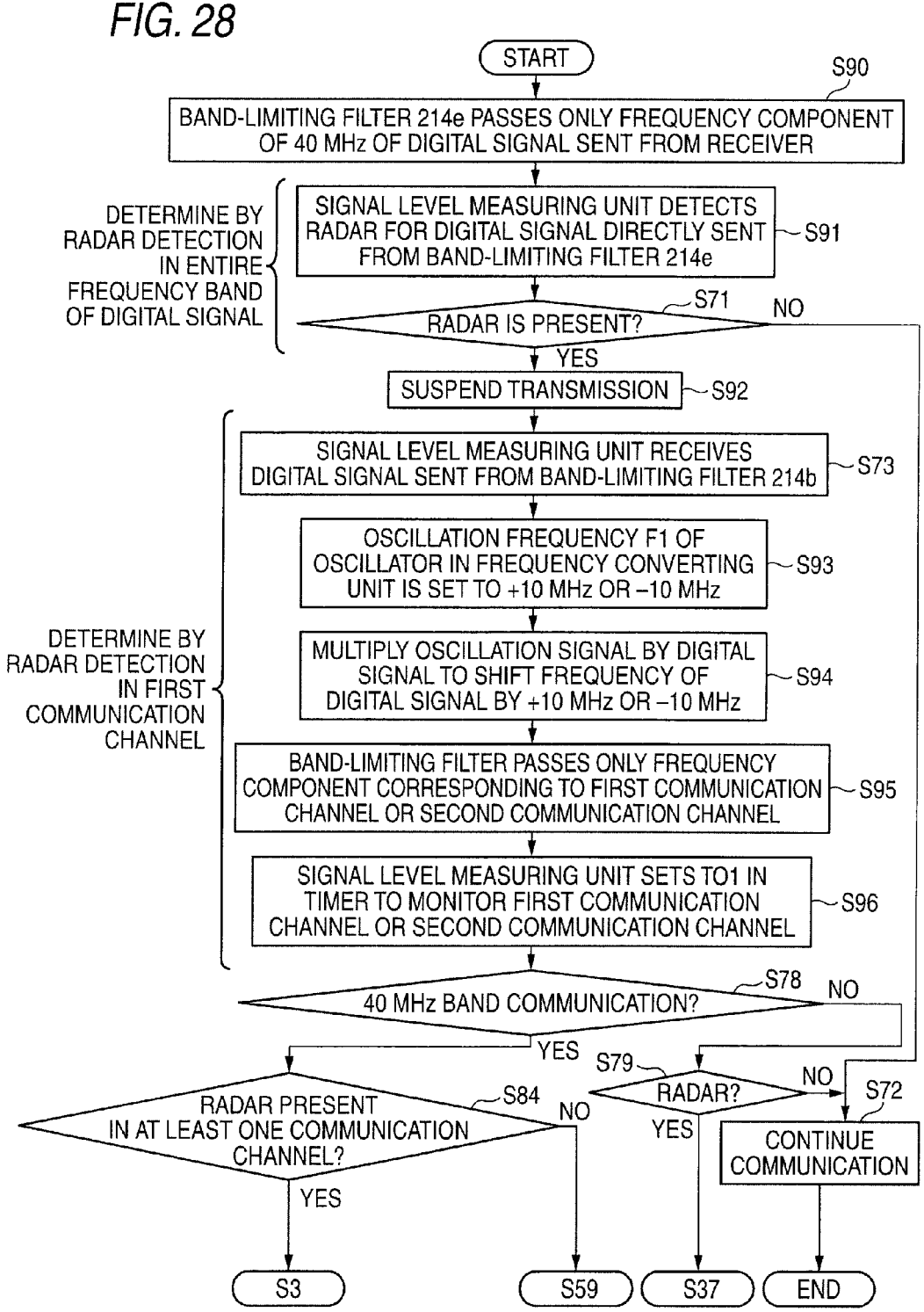
FIG. 28 is a flowchart showing an operation of the wireless communication device related to the sixth embodiment.

The operation of the radar detecting units 214-1 and 214-2 with the above configuration will be described with reference to FIG. 28. FIG. 28 is a flowchart of a radar detection operation in the radar detecting units 214-1 and 214-2.

As shown in FIG. 28, the processes in steps S90, S91, S71, S92, and S73 described in the fifth embodiment are sequentially performed in the radar detecting units 214-1 and 214-2.

After step S73, in the radar detecting units 214-1 and 214-2, the oscillation frequency f1 of the oscillator 216 of the frequency converting unit 214a is set to +10 MHz and −10 MHz, respectively (S93). The complex multiplier 217 in the respective radar detecting units 214-1 and 214-2 performs a complex number multiplication of the digital signal by the oscillation signal to shift the frequencies of the digital signal by +10 MHz and −10 MHz, respectively (S94). The process of steps S93 and S94 are the same as described with reference to FIGS. 18A-18C and FIGS. 19A-19C.

The band-limiting filters 214b in the radar detecting units 214-1 and 214-2 pass only frequency components corresponding to the first communication channel and second communication channel of the frequency-converted digital signal (S95). The process in step S95 is the same as described using FIGS. 21A and 21B. The signal level measuring units 214c in the radar detecting units 214-1 and 214-2 set the radar observation time TO1 in the timers to measure the digital signal filtered in the band-limiting filters 214b during the time TO1. The signal level measuring units 214c in the radar detecting units 214-1 and 214-2 measure the intensity of the frequency components corresponding to the first communication channel and second communication channel (S96). Thereafter, the process proceeds to step S78 as in the fifth embodiment.

As described above, according to the wireless communication device related to the sixth embodiment, the following advantage (9) can be obtained in addition to the advantages (4)-(8) described in the fourth and fifth embodiments.

(9) A Circuit Size of the Wireless Communication Device Can Be Reduced.

According to the wireless communication device 200 related to the sixth embodiment, the radar detecting units 214-1 to 214-3 are provided in each of the antennas 201-1 to 201-3. The radar detection in the radio signal received from each of the antennas 201-1 to 201-3 is performed by each of the radar detecting units 214-1 to 214-3. In this case, the configuration of each of the radar detecting units 214-1 to 214-3 is that of FIG. 24 described in the fifth embodiment, and the frequency band to be detected by each of the radar detecting units 214-1 to 214-3 is controlled by the frequency converting unit 214a.

Specifically, for example, since the oscillation frequency f1 of the oscillator 216 of in the radar detecting unit 214-1 is +10 MHz, the radar detecting unit 214-1 detects the radar in a range of −20 MHz from the central frequency of the digital signal. Since the oscillation frequency f1 of the oscillator 216 of in the radar detecting unit 214-2 is −10 MHz, the radar detecting unit 214-1 detects the radar in a range of +20 MHz from the central frequency of the digital signal.

As described above, since the respective radar detecting units 214-1 to 214-3 have the same circuit configurations, a circuit size of an entire wireless communication device 200 can be reduced even when a plurality of antennas are provided.

Power consumption of the wireless communication device 200 can be reduced in a state in which the operation of the unnecessary radar detecting unit 214-3 among a plurality of radar detecting units 214-1 to 214-3 is stopped. Although a case in which the number of antennas and radar detecting units is 3 has been described in the sixth embodiment, of course, the number is not limited thereto.

As described in detail in the above description, according to the wireless communication devices related to the first to sixth embodiments, when the wireless communication is performed using the frequency band (the second frequency band) including the first communication channel and the second communication channel that is adjacent to the first communication channel, it is possible to detect whether or not the radar is present in the first communication channel and whether or not the radar is present in the second communication channel. Thus, when the radar is present only in the second communication channel, a communication channel is unnecessary to be changed by continuing the wireless communication using only the first communication channel. Thus, it is possible to improve an efficiency in usage of the frequency band while improving the operation speed of the wireless communication device.

In the first to sixth embodiments, examples in which the radar is detected during a process of the wireless communication has been described. However, the detection of the radar may be performed in advance of starting the wireless communication. In this case, a communication channel not used by any radar is detected in advance by performing radar detection before selecting a communication channel. And, when starting the wireless communication channel, the communication channel not used by any radar is selected.

When transitioning to a new communication channel, the wireless base station 101 may notify the wireless terminal stations 102 and 103 within the BSS that the communication channel is transitioned to the new communication channel. In this case, the wireless base station 101 transmits a command or data to the wireless terminal stations 102 and 103 before transitioning to the new communication channel.

Each components explained in the first to sixth embodiments may be implemented by hardware of an analog or digital circuit, or by software that runs on a processor.

In the first to sixth embodiments, examples of transitioning the communication channel or narrowing the frequency band from the 40 MHz bandwidth to 20 MHz bandwidth upon radar detection have been described. However, countermeasures to be taken when the radar is detected are not limited to those described in the above embodiments. For example, whether to start the communication in 20 MHz bandwidth or to start the communication in 40 MHz bandwidth after transitioning to a new communication channel by the frequency switching unit 209 may be optionally determined as long as the newly occupying frequency band is different from the frequency band in which the radar is detected. That is, the wireless base station 101 may select which bandwidth to be used after the radar is detection in accordance with an algorithm employed in the wireless base station 101.

Although the first frequency bandwidth is defined as 20 MHz and the second frequency bandwidth is defined as 40MHz in the first to sixth embodiments, the bandwidths are not limited thereto. That is, the first frequency bandwidth and the second frequency bandwidth may respectively set to 20 MHz and 80MHz, or may respectively set to 40 MHz and 80 MHz.

In the above description, the sixth embodiment is described as an example in which each of the radar detecting units 214-1 to 214-3 has a configuration as shown in FIG. 24, which is described in detail in the fifth embodiment, however, each of the radar detecting units 214-1 to 214-3 may have a configuration as shown in FIG. 14, which is described in detail in the fourth embodiment. In this case, the process of step S92 shown in FIG. 28 is performed after the radar is determined to be present in step S84 (step S84, YES).

The radar detecting unit 214 described in the fourth and fifth embodiments is not limited to the configuration for detecting the presence of a radar in the communication channel. That is, the radar detecting unit 214 may be configured as a signal detection circuit for detecting a pulse signal in a given frequency band. Even in this case, a configuration of the frequency converting unit or the band-limiting filter can be simplified by setting an input signal to a digital signal, thereby improving the detection speed or accuracy of the pulse signal.

In the embodiments described above, examples are described for detecting the presence of the radar by detecting a pulse signal of the radar as an interference signal in the communication channel. However, the above embodiments are not limited to detecting the radar as required by the radio law and are applicable for detecting any interference signal that interferes with communication.

The interference signal may be, other than a pulse signal received from a radar such as a weather radar, a signal received from a system other than that included in the BBS used for the wireless communication, such as a signal received from a equipment conforming to a Bluetooth standard or a microwave oven. The interference signal may also be a signal that is received from a device included in the BBS but is unnecessary to receive for establishing and performing the wireless communication with the counterpart device (communication target). For example, in a case where the wireless communication device is employed as a wireless LAN device, the interference signal may be a wireless LAN signal that is unnecessary to be received by the wireless LAN device.

It is to be understood that the present invention is not limited to the specific embodiments described above and that the present invention can be embodied with the components modified without departing from the spirit and scope of the present invention. The present invention can be embodied in various forms according to appropriate combinations of the components disclosed in the embodiments described above. For example, some components may be deleted from the configurations as described as the embodiments. Further, the components in different embodiments may be used appropriately in combination.

What is claimed is:

1. A wireless communication device comprising:
    a wireless communication unit that is configured to:
        perform a wireless communication in a first mode using a first frequency band serving as a first communication channel; and
        perform the wireless communication in a second mode using a second frequency band including the first communication channel and a second communication channel that is adjacent to the first communication channel;
    a detection unit that is configured to:
        monitor each of the first frequency band and the second frequency band;
        output a first detection signal when an interference signal is detected in the first frequency band; and
        output a second detection signal when the interference signal is detected in the second frequency band; and
    a determination unit that determines whether the interference signal is in the first communication channel or in the second communication channel based on the first detection signal and the second detection signal, wherein the determination unit determines that the interference signal is in the second communication channel when the first detection signal is not output and the second detection signal is output from the detection unit.

2. The device according to claim 1 further comprising:
    a first filter that filters a radio signal received by the wireless communication unit to output a first component of the radio signal corresponding to the first frequency band; and
    a second filter that filters the radio signal to output a second component of the radio signal corresponding to the second frequency band,
    wherein the detection unit comprises:
        a first detector that is configured to detect the interference signal in the first component output from the first filter; and
        a second detector that is configured to detect the interference signal in the second component output from the second filter.

* * * * *